US011881061B2

(12) United States Patent
Daimon et al.

(10) Patent No.: US 11,881,061 B2
(45) Date of Patent: Jan. 23, 2024

(54) WORK MACHINE AND SYSTEM INCLUDING WORK MACHINE

(71) Applicant: KOMATSU LTD., Tokyo (JP)

(72) Inventors: Masaki Daimon, Tokyo (JP); Hiroyuki Aratame, Tokyo (JP)

(73) Assignee: KOMATSU LTD., Tokyo (JP)

( * ) Notice: Subject to any disclaimer, the term of this patent is extended or adjusted under 35 U.S.C. 154(b) by 683 days.

(21) Appl. No.: 16/962,580

(22) PCT Filed: Mar. 14, 2019

(86) PCT No.: PCT/JP2019/010486
§ 371 (c)(1),
(2) Date: Jul. 16, 2020

(87) PCT Pub. No.: WO2020/003638
PCT Pub. Date: Jan. 2, 2020

(65) Prior Publication Data
US 2020/0402324 A1 Dec. 24, 2020

(30) Foreign Application Priority Data
Jun. 29, 2018 (JP) ................................ 2018-124615

(51) Int. Cl.
*G07C 5/02* (2006.01)
*E02F 3/28* (2006.01)
(Continued)

(52) U.S. Cl.
CPC ................ *G07C 5/02* (2013.01); *E02F 3/283* (2013.01); *E02F 9/2004* (2013.01); *E02F 9/26* (2013.01); *E02F 9/2225* (2013.01)

(58) Field of Classification Search
CPC ......... E02F 3/283; E02F 3/431; E02F 9/2004; E02F 9/2225; E02F 9/26; E02F 9/264; G07C 5/02
See application file for complete search history.

(56) References Cited

U.S. PATENT DOCUMENTS 5,860,480 A * 1/1999 Jayaraman .............. E02F 3/845 701/50
8,639,429 B2 1/2014 Shirao
(Continued)

FOREIGN PATENT DOCUMENTS

CA 3031622 A1 5/2018
CN 102829008 A 12/2012
(Continued)

OTHER PUBLICATIONS

Office Action dated Jan. 25, 2023 that issued in U.S. Appl. No. 16/962,561.

*Primary Examiner* — Tyler J Lee
(74) *Attorney, Agent, or Firm* — Faegre Drinker Biddle & Reath LLP

(57) ABSTRACT

A time period for which an ineffective operation is performed during an excavation work is reduced. A work machine includes a vehicular body, a running wheel rotatably attached to the vehicular body, a work implement operable with respect to the vehicular body, an operation apparatus for operating the running wheel and the work implement, and a controller that controls an operation by the work machine. The controller determines that an ineffective operation in which the work implement does not work is being performed during the excavation work based on an operation command value output from the operation apparatus and outputs a time period for which the ineffective operation is being performed.

8 Claims, 20 Drawing Sheets

(51) Int. Cl.

| | |
|---|---|
| ***E02F 9/20*** | (2006.01) |
| ***E02F 9/26*** | (2006.01) |
| ***E02F 9/22*** | (2006.01) |

(56) References Cited

U.S. PATENT DOCUMENTS

| | | | | |
|---|---|---|---|---|
| 9,309,650 | B2 | 4/2016 | Nagato et al. | |
| 9,555,706 | B1 | 1/2017 | Mitchell et al. | |
| 2003/0019132 | A1* | 1/2003 | Kurenuma | E02F 9/2041 701/50 |
| 2006/0025917 | A1 | 2/2006 | Pandey et al. | |
| 2006/0245896 | A1 | 11/2006 | Alshaer et al. | |
| 2008/0127530 | A1 | 6/2008 | Kelly | |
| 2008/0243345 | A1 | 10/2008 | Knight | |
| 2008/0255735 | A1 | 10/2008 | Marathe et al. | |
| 2012/0310494 | A1 | 12/2012 | Asami et al. | |
| 2012/0323451 | A1 | 12/2012 | Shatters et al. | |
| 2013/0259620 | A1 | 10/2013 | Shirao | |
| 2013/0313033 | A1 | 11/2013 | Elliott | |
| 2014/0207346 | A1 | 7/2014 | Filla et al. | |
| 2014/0330490 | A1 | 11/2014 | Aoki et al. | |
| 2015/0139767 | A1 | 5/2015 | Moriki et al. | |
| 2016/0289926 | A1 | 10/2016 | Alig et al. | |
| 2017/0002544 | A1 | 1/2017 | Fletcher et al. | |
| 2017/0066324 | A1 | 3/2017 | Hertel et al. | |
| 2017/0107692 | A1 | 4/2017 | Robertson et al. | |
| 2017/0278425 | A1* | 9/2017 | Kozumi | E02F 9/26 |
| 2018/0298584 | A1 | 10/2018 | Okada | |
| 2018/0341901 | A1* | 11/2018 | Shike | G06Q 50/08 |
| 2019/0166762 | A1* | 6/2019 | Wu | A01B 63/111 |
| 2019/0337778 | A1 | 11/2019 | G et al. | |
| 2020/0402324 | A1 | 12/2020 | Daimon et al. | |

FOREIGN PATENT DOCUMENTS

| | | | |
|---|---|---|---|
| CN | 103597256 | A | 2/2014 |
| CN | 105649133 | A | 6/2016 |
| EP | 2667059 | A1 | 11/2013 |
| JP | S62-268433 | A | 11/1987 |
| JP | S63-044029 | A | 2/1988 |
| JP | H02-283830 | A | 11/1990 |
| JP | H03-286045 | A | 12/1991 |
| JP | H05-239850 | A | 9/1993 |
| JP | H06-193097 | A | 7/1994 |
| JP | H10-280467 | A | 10/1998 |
| JP | 3030830 | B2 | 2/2000 |
| JP | 2005-146886 | A | 6/2005 |
| JP | 2011-63945 | A | 3/2011 |
| JP | 2011-184886 | A | 9/2011 |
| JP | 2013-070519 | A | 4/2013 |
| JP | 2018-071255 | A | 5/2018 |
| WO | WO-2007/072701 | A1 | 6/2007 |
| WO | WO-2013/145341 | A1 | 10/2013 |
| WO | WO-2013/183595 | A1 | 12/2013 |
| WO | WO 2017/104238 | A1 | 6/2017 |

* cited by examiner

FIG.5

| WORK STEP | | | UNLOADED FORWARD TRAVEL | EXCAVATION (PUSHING) | EXCAVATION (SCOOPING) | LOADED REARWARD TRAVEL | LOADED FORWARD TRAVEL | SOIL EJECTION | REARWARD TRAVEL・BOOM LOWERING | SIMPLE TRAVELING |
|---|---|---|---|---|---|---|---|---|---|---|
| FORWARD AND REARWARD TRAVEL SWITCHIN LEVER | F | | ○ | ○ | ○ | | ○ | ○ | | (○) |
| | N | | | | | | | | | |
| | R | | | | ○ | ○ | | | ○ | |
| OPERATION OF WORK IMPLEMENT | BOOM | LOWER | | | | | | | ○ | |
| | | NEUTRAL | ○ | ○ | (○ | (○ | (○ | (○ | | ○ |
| | | RAISE | | | ○) | ○) | ○) | ○) | | |
| | BUCKET | DUMP | | | | | | ○ | | |
| | | NEUTRAL | ○ | ○ | | ○ | ○ | | | ○ |
| | | TILT BACK | | | ○ | | | | ○ | |
| PRESSURE OF CYLINDER OF WORK IMPLEMENT | | | LOWER THAN P | A–C | A–C | B–P | B–P | B–P | LOWER THAN P | LOWER THAN C |

FIG.10
(1) RELATION BETWEEN CUTTING EDGE TRACE X AND CUTTING EDGE TRACE Y
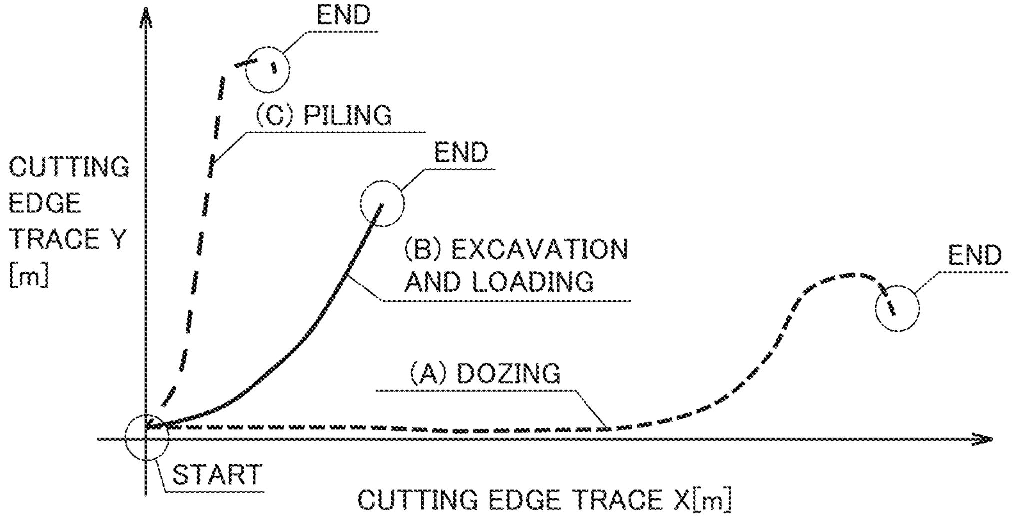
(2) RELATION BETWEEN CUTTING EDGE TRACE X AND BUCKET ANGLE
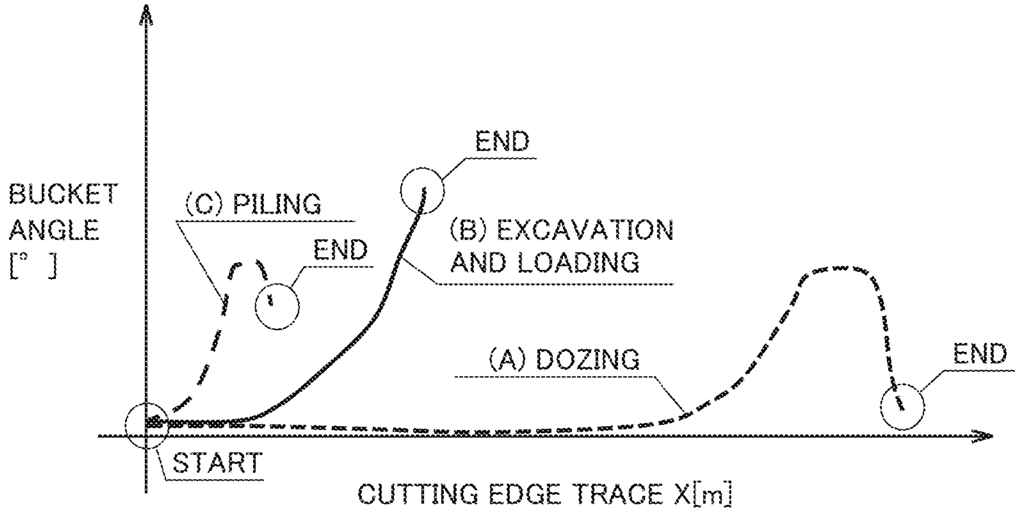

WORK MACHINE AND SYSTEM INCLUDING WORK MACHINE

TECHNICAL FIELD

The present disclosure relates to a work machine and a system including a work machine.

BACKGROUND ART

For example, WO2007/072701 (PTL 1) discloses a technique in connection with a work machine for determining whether or not to give a representation that suggests an energy-saving operation to an operator based on whether or not an accelerator position and an actual number of rotations of an engine satisfy a prescribed operation condition and urging the operator to perform the energy-saving operation.

CITATION LIST

Patent Literature

PTL 1: WO2007/072701

SUMMARY OF INVENTION

Technical Problem

Among works by a wheel loader, excavation in which a vehicle travels forward and a boom is raised to scoop soil into a bucket represents one of works that consume much fuel. A longer time period for excavation significantly affects overall fuel efficiency during operations. Therefore, improvement in fuel efficiency by reducing an excavation time period by reducing an ineffective operation that will result in a longer time period for excavation has been desired.

The present disclosure provides a work machine and a system including the work machine capable of achieving a shorter time period of an ineffective operation during an excavation work.

Solution to Problem

According to one aspect of the present disclosure, a work machine is provided. The work machine includes a vehicular body, a running wheel rotatably attached to the vehicular body, a work implement operable with respect to the vehicular body, an operation apparatus for operating the running wheel and the work implement, and a controller that controls an operation by the work machine. The controller determines that an ineffective operation in which the work implement does not work is being performed during an excavation work based on an operation command value output from the operation apparatus and outputs a time period for which the ineffective operation is being performed.

According to one aspect of the present disclosure, a system including a work machine is provided. The system includes a vehicular body, a running wheel rotatably attached to the vehicular body, a work implement operable with respect to the vehicular body, an operation apparatus for operating the running wheel and the work implement, and a controller that controls an operation by the work machine. The controller determines that an ineffective operation in which the work implement does not work is being performed during an excavation work based on an operation command value output from the operation apparatus and outputs a time period for which the ineffective operation is being performed.

Advantageous Effects of Invention

According to the present disclosure, a time period of an ineffective operation during an excavation work can be reduced.

BRIEF DESCRIPTION OF DRAWINGS

FIG. 5 shows a table showing a determination method in the series of work steps included in the excavation operation and the loading operation by the wheel loader.

FIG. 10 shows a graph of a trace of a cutting edge of a bucket during works by the wheel loader.

DESCRIPTION OF EMBODIMENTS

Figure 1:
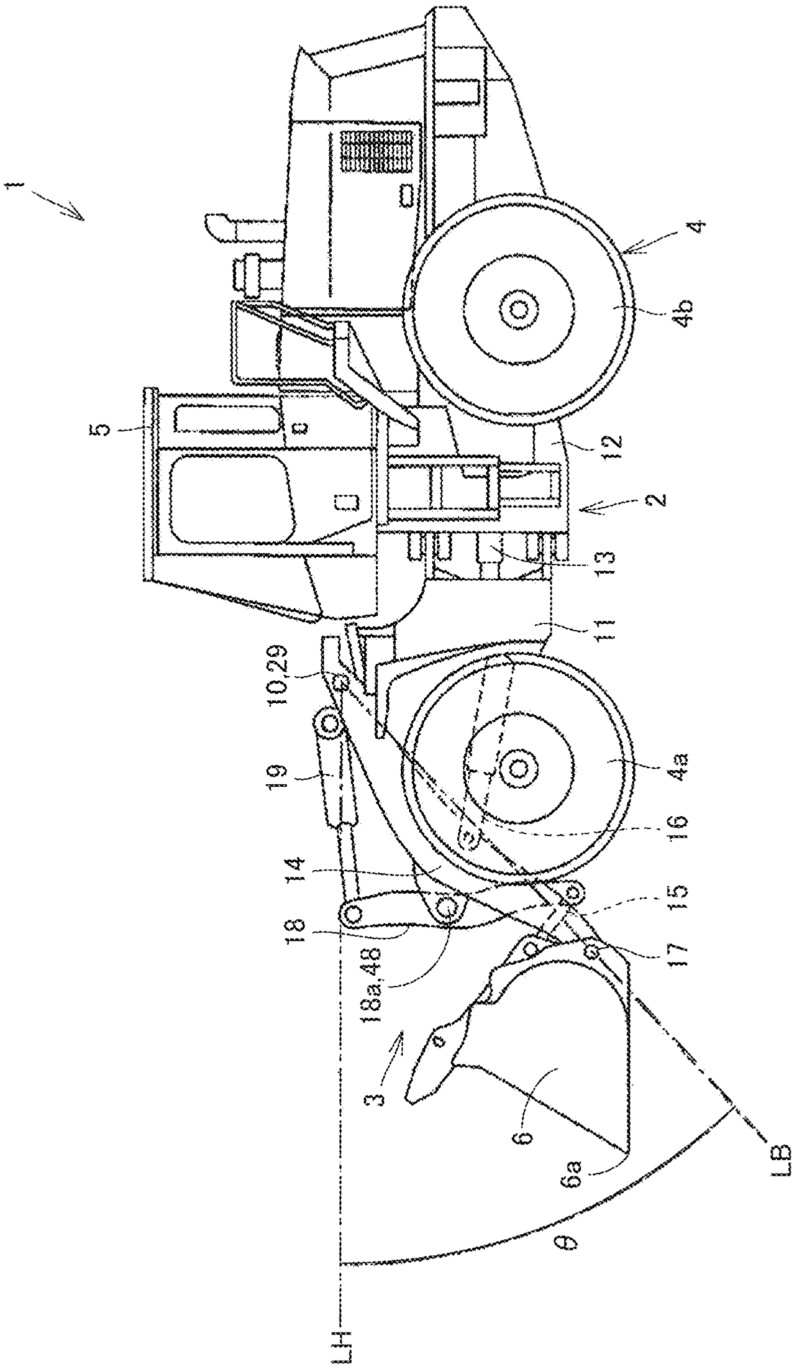
FIG. 1 is a side view of a wheel loader based on an embodiment.

An embodiment will be described below with reference to the drawings. The same elements have the same reference characters allotted in the description below and their labels and functions are also the same. Therefore, detailed description thereof will not be repeated.

First Embodiment

<Overall Configuration>

A wheel loader 1 will be described by way of example of a work machine in the embodiment. FIG. 1 is a side view of wheel loader 1 based on the embodiment.

As shown in FIG. 1, wheel loader 1 includes a vehicular body frame 2 (corresponding to a vehicular body in the embodiment), a work implement 3, a traveling unit 4, and a cab 5. Traveling unit 4 includes running wheels 4*a* and 4*b*. Wheel loader 1 is mobile as running wheels 4*a* and 4*b* are rotationally driven, and can perform a desired work with work implement 3.

Vehicular body frame 2 includes a front frame 11 and a rear frame 12. Front frame 11 and rear frame 12 are attached to each other in a manner swingable in a lateral direction. A steering cylinder 13 is attached to front frame 11 and rear frame 12. Steering cylinder 13 is a hydraulic cylinder. As steering cylinder 13 extends and contracts as being driven by hydraulic oil from a steering pump (not shown), a direction of travel of wheel loader 1 is laterally changed.

A direction in which wheel loader 1 travels in straight lines is herein referred to as a fore/aft direction of wheel loader 1. In the fore/aft direction of wheel loader 1, a side where work implement 3 is arranged with respect to vehicular body frame 2 is defined as the fore direction and a direction opposite to the fore direction is defined as the aft direction. A lateral direction of wheel loader 1 is a direction orthogonal to the fore/aft direction in a plan view. A right side and a left side in the lateral direction in facing front are defined as a right direction and a left direction, respectively. An upward/downward direction of wheel loader 1 is a direction orthogonal to the plane defined by the fore/aft direction and the lateral direction. A side in the upward/downward direction where the ground is located is defined as a lower side and a side where the sky is located is defined as an upper side.

The fore/aft direction refers to a fore/aft direction of an operator who sits at an operator's seat in cab 5. The lateral direction refers to a lateral direction of the operator who sits at the operator's seat. The lateral direction refers to a direction of a vehicle width of wheel loader 1. The upward/downward direction refers to an upward/downward direction of the operator who sits at the operator's seat. A direction in which the operator sitting at the operator's seat faces is defined as the fore direction and a direction behind the operator sitting at the operator's seat is defined as the aft direction. A right side and a left side at the time when the operator sitting at the operator's seat faces front are defined as the right direction and the left direction, respectively. A foot side of the operator who sits at the operator's seat is defined as a lower side, and a head side is defined as an upper side.

Work implement 3 and running wheel 4*a* are attached to front frame 11. Work implement 3 includes a boom 14 and a bucket 6. A base end of boom 14 is rotatably attached to front frame 11 by a boom pin 10. Bucket 6 is rotatably attached to boom 14 by a bucket pin 17 located at a tip end of boom 14. Front frame 11 and boom 14 are coupled to each other by a boom cylinder 16. Boom cylinder 16 is a hydraulic cylinder. As boom cylinder 16 extends and contracts as being driven by hydraulic oil from a work implement pump 25 (see FIG. 2), boom 14 moves upward and downward. Boom cylinder 16 drives boom 14.

Work implement 3 further includes a bell crank 18, a tilt cylinder 19, and a tilt rod 15. Bell crank 18 is rotatably supported on boom 14 by a support pin 18*a* located substantially in the center of boom 14. Tilt cylinder 19 couples a base end of bell crank 18 and front frame 11 to each other. Tilt rod 15 couples a tip end of bell crank 18 and bucket 6 to each other. Tilt cylinder 19 is a hydraulic cylinder. As tilt cylinder 19 extends and contracts as being driven by hydraulic oil from work implement pump 25 (see FIG. 2), bucket 6 pivots upward and downward. Tilt cylinder 19 drives bucket 6.

Cab 5 and running wheel 4*b* are attached to rear frame 12. Cab 5 is arranged in the rear of boom 14. Cab 5 is carried on vehicular body frame 2. A seat where an operator sits and an operation apparatus are arranged in cab 5.

Figure 2:
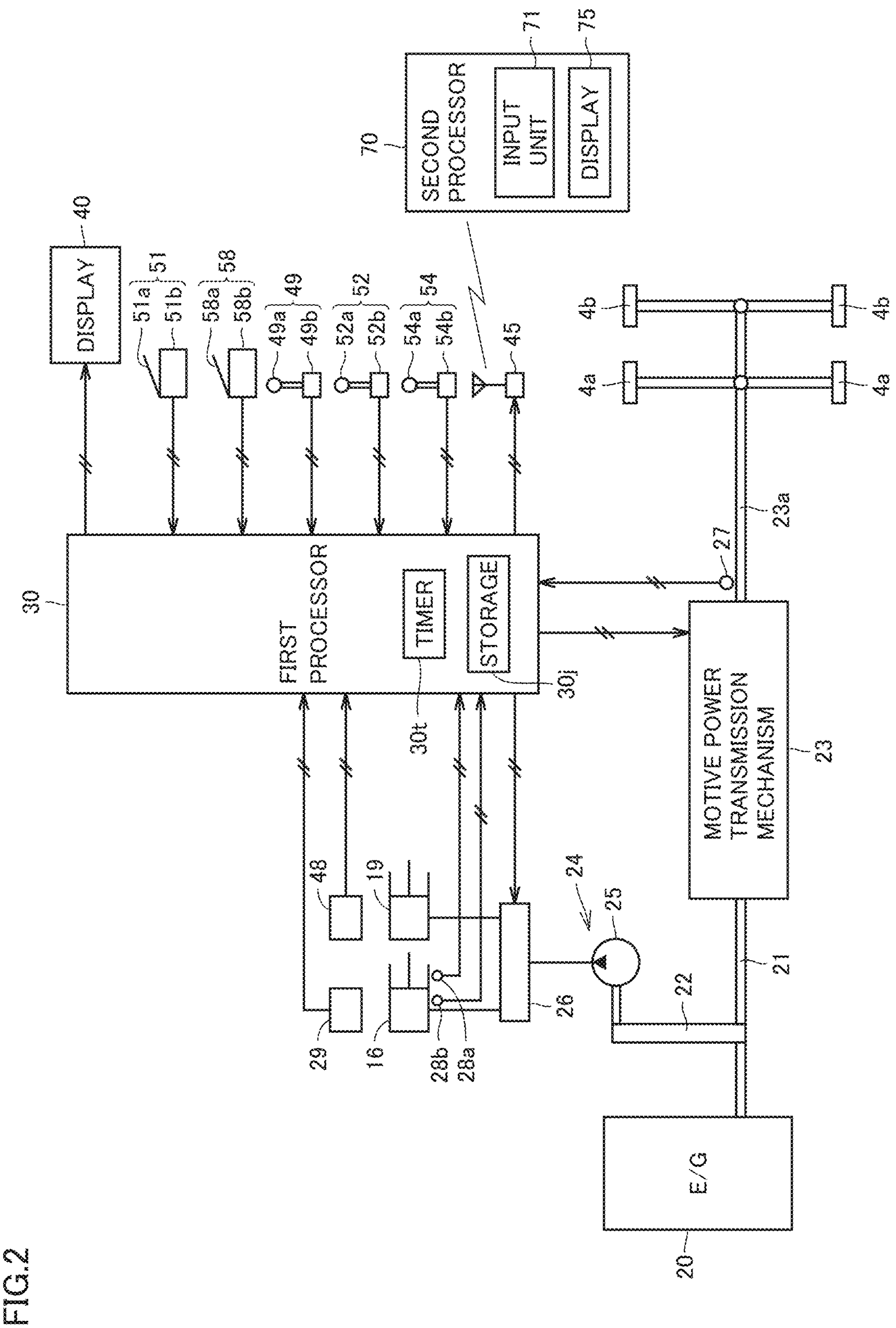
FIG. 2 is a schematic block diagram of the wheel loader.

FIG. 2 is a schematic block diagram showing a configuration of wheel loader 1. Wheel loader 1 includes an engine 20, a motive power extraction unit 22, a motive power transmission mechanism 23, a cylinder driving unit 24, a first angle detector 29, a second angle detector 48, and a first processor 30. Engine 20, motive power extraction unit 22, motive power transmission mechanism 23, cylinder driving unit 24, first angle detector 29, second angle detector 48, and first processor 30 are mounted on vehicular body frame 2 shown in FIG. 1.

Engine 20 represents an exemplary drive source that generates driving force for traveling of wheel loader 1 and generates driving force for operating work implement 3. Engine 20 is, for example, a diesel engine. Output from engine 20 is controlled by adjusting an amount of fuel to be injected into a cylinder of engine 20.

Motive power extraction unit 22 is an apparatus that distributes output from engine 20 to motive power transmission mechanism 23 and cylinder driving unit 24.

Motive power transmission mechanism 23 is a mechanism that transmits driving force from engine 20 to running wheels 4*a* and 4*b*. Motive power transmission mechanism 23 changes a speed of rotation of an input shaft 21 and outputs resultant rotation to an output shaft 23*a*.

A vehicle speed detector 27 that detects a speed of wheel loader 1 is attached to output shaft 23*a* of motive power transmission mechanism 23. Wheel loader 1 includes vehicle speed detector 27. Vehicle speed detector 27 detects a speed of movement of wheel loader 1 by traveling unit 4 by detecting a rotation speed of output shaft 23*a*. Vehicle speed detector 27 functions as a rotation sensor that detects a rotation speed of output shaft 23*a*. Vehicle speed detector 27 functions as a movement detector that detects movement by traveling unit 4. Vehicle speed detector 27 outputs a detection signal representing a vehicle speed of wheel loader 1 to first processor 30.

Cylinder driving unit 24 includes work implement pump 25 and a control valve 26. Output from engine 20 is transmitted to work implement pump 25 through motive power extraction unit 22. Hydraulic oil delivered from work implement pump 25 is supplied to boom cylinder 16 and tilt cylinder 19 through control valve 26.

First hydraulic pressure detectors 28*a* and 28*b* that detect a hydraulic pressure in an oil chamber in boom cylinder 16 are attached to boom cylinder 16. Wheel loader 1 includes first hydraulic pressure detectors 28*a* and 28*b*. First hydraulic pressure detectors 28*a* and 28*b* include, for example, a pressure sensor 28*a* for head pressure detection and a pressure sensor 28*b* for bottom pressure detection.

Pressure sensor 28*a* is attached to a head side of boom cylinder 16. Pressure sensor 28*a* can detect a pressure (a head pressure) of hydraulic oil in the oil chamber on a side of a cylinder head of boom cylinder 16. Pressure sensor 28*a* outputs a detection signal representing a head pressure of boom cylinder 16 to first processor 30.

Pressure sensor 28*b* is attached to a bottom side of boom cylinder 16. Pressure sensor 28*b* can detect a pressure (a bottom pressure) of hydraulic oil in the oil chamber on a side of a cylinder bottom of boom cylinder 16. Pressure sensor 28*b* outputs a detection signal representing a bottom pressure of boom cylinder 16 to first processor 30.

For example, a potentiometer attached to boom pin 10 is employed as first angle detector 29. First angle detector 29 detects a boom angle representing a lift angle (a tilt angle) of boom 14. First angle detector 29 outputs a detection signal representing a boom angle to first processor 30.

Specifically, as shown in FIG. 1, a boom angle θ represents an angle of a straight line LB extending in a direction from the center of boom pin 10 toward the center of bucket pin 17 with respect to a horizontal line LH extending forward from the center of boom pin 10. A case that straight line LB is horizontal is defined as boom angle θ=0°. A case that straight line LB is located above horizontal line LH is defined as a positive boom angle θ. A case that straight line LB is located below horizontal line LH is defined as a negative boom angle θ.

A stroke sensor arranged in boom cylinder 16 may be employed as first angle detector 29.

For example, a potentiometer attached to support pin 18*a* is employed as second angle detector 48. Second angle detector 48 detects a bucket angle representing a tilt angle of bucket 6 with respect to boom 14 by detecting an angle of bell crank 18 (bell crank angle) with respect to boom 14. Second angle detector 48 outputs a detection signal representing a bucket angle to first processor 30. The bucket angle is, for example, an angle formed between straight line LB and a straight line that connects the center of bucket pin 17 and a cutting edge 6*a* of bucket 6 to each other. When cutting edge 6*a* of bucket 6 is located above straight line LB, the bucket angle is defined as positive.

A stroke sensor arranged in tilt cylinder 19 may be employed as second angle detector 48.

Wheel loader 1 includes in cab 5, an operation apparatus operated by an operator. The operation apparatus includes a forward and rearward travel switching apparatus 49, an accelerator operation apparatus 51, a boom operation apparatus 52, a bucket operation apparatus 54, and a brake operation apparatus 58. Forward and rearward travel switching apparatus 49, accelerator operation apparatus 51, and brake operation apparatus 58 implement an operation apparatus for traveling of wheel loader 1. Boom operation apparatus 52 and bucket operation apparatus 54 implement an operation apparatus for operating work implement 3.

Forward and rearward travel switching apparatus 49 includes an operation member 49*a* and a member position detection sensor 49*b*. Operation member 49*a* is operated by an operator for indicating switching between forward travel and rearward travel of the vehicle. Operation member 49*a* can be switched to a position of each of forward travel (F), neutral (N), and rearward travel (R). Member position detection sensor 49*b* detects a position of operation member 49*a*. Member position detection sensor 49*b* outputs to first processor 30, a detection signal (forward travel, neutral, or rearward travel) representing a command to travel forward or rearward indicated by a position of operation member 49*a*.

Accelerator operation apparatus 51 includes an accelerator operation member 51*a* and an accelerator operation detection unit 51*b*. Accelerator operation member 51*a* is operated by an operator for setting a target rotation speed of engine 20. Accelerator operation detection unit 51*b* detects an amount of operation onto accelerator operation member 51*a* (an amount of accelerator operation). Accelerator operation detection unit 51*b* outputs a detection signal representing an amount of accelerator operation to first processor 30.

Brake operation apparatus 58 includes a brake operation member 58*a* and a brake operation detection unit 58*b*. Brake operation member 58*a* is operated by an operator for controlling deceleration force of wheel loader 1. Brake operation detection unit 58*b* detects an amount of operation onto brake operation member 58*a* (an amount of brake operation). Brake operation detection unit 58*b* outputs a detection signal representing an amount of brake operation to first processor 30. A pressure of brake oil may be used as an amount of brake operation.

Boom operation apparatus 52 includes a boom operation member 52*a* and a boom operation detection unit 52*b*. Boom operation member 52*a* is operated by an operator for raising or lowering boom 14. Boom operation detection unit 52*b* detects a position of boom operation member 52*a*. Boom operation detection unit 52*b* outputs to first processor 30, a detection signal representing a command to raise or lower boom 14 indicated by the position of boom operation member 52*a*.

Bucket operation apparatus 54 includes a bucket operation member 54*a* and a bucket operation detection unit 54*b*. Bucket operation member 54*a* is operated by an operator for causing bucket 6 to perform an excavation operation or a dumping operation. Bucket operation detection unit 54*b* detects a position of bucket operation member 54*a*. Bucket operation detection unit 54*b* outputs to first processor 30, a detection signal representing a command to operate bucket 6 in an excavation direction or a dump direction indicated by a position of bucket operation member 54*a*.

First angle detector 29, second angle detector 48, first hydraulic pressure detectors 28*a* and 28*b*, boom operation detection unit 52*b*, and bucket operation detection unit 54*b* are included in a work implement sensor. The work implement sensor senses a state of work implement 3. A weight of loads in bucket 6 can be calculated based on a detection value from the work implement sensor. The work implement sensor includes at least one of a pressure sensor and a strain sensor. The work implement sensor includes a work implement position sensor. The work implement position sensor is constituted, for example, of first angle detector 29, second angle detector 48, boom operation detection unit 52*b*, and bucket operation detection unit 54*b*.

First processor 30 is implemented by a microcomputer including a storage such as a random access memory (RAM) or a read only memory (ROM) and a computing device such as a central processing unit (CPU). First processor 30 controls operations of engine 20, work implement 3, and motive power transmission mechanism 23. First processor 30 may be implemented as some of functions of a controller of wheel loader 1.

A signal representing a vehicle speed of wheel loader 1 detected by vehicle speed detector 27, a signal representing a boom angle detected by first angle detector 29, a signal representing a bottom pressure of boom cylinder 16 detected by pressure sensor 28*b*, and a signal representing a forward and rearward travel command detected by forward and rearward travel switching apparatus 49 are input to first processor 30. First processor 30 obtains by summation, work information on transportation of loads in bucket 6 based on the input signals.

The transportation work information refers, for example, to the number of times of transportation works, a total weight in transportation, a total distance of transportation, and a total workload. The number of times of transportation works represents the number of times of prescribed transportation works such as V-shape loading during a period from start until end of summation. The period from start until end of summation means, for example, a period for which an operator drives wheel loader 1 within a prescribed time period such as one day. The period is desirably managed for each operator. The period may manually be set by an operator. The total weight in transportation means a total weight of loads transported by bucket 6 during a period from start until end of summation. The total distance of transportation means a total distance of movement of wheel loader 1 with bucket 6 being loaded during a period from start until end of summation. The total workload means a product of the total weight in transportation and the total distance of transportation during a period from start until end of summation.

A signal representing a bucket angle detected by second angle detector 48 is input to first processor 30. First processor 30 calculates a current position of cutting edge 6*a* of bucket 6 based on a signal representing a vehicle speed of wheel loader 1, a signal representing a boom angle, and a signal representing a bucket angle.

Wheel loader 1 further includes a display 40 and an output unit 45. Display 40 is implemented by a monitor arranged in cab 5 and viewed by an operator. Display 40 shows transportation work information obtained by summation by first processor 30. Display 40 may be attached to a front pillar of cab 5. When a door for entry and exit of an operator is provided in a left side surface of cab 5, display 40 may be attached to a right front pillar of cab 5.

Display 40 may be in wired connection to first processor 30 through a communication cable. Alternatively, display 40 may receive data from first processor 30 through a wireless local area network (LAN).

Output unit 45 outputs transportation work information to a server (a second processor 70) provided outside wheel loader 1. Output unit 45 may have a communication function such as wireless communication and may communicate with an input unit 71 of second processor 70. Alternatively, output unit 45 may be implemented, for example, by an interface of a portable storage (such as a memory card) that can be accessed from input unit 71 of second processor 70. Second processor 70 includes a display 75 that performs a monitor function and can show transportation work information output from output unit 45.

<Excavation Work>

Figure 3:
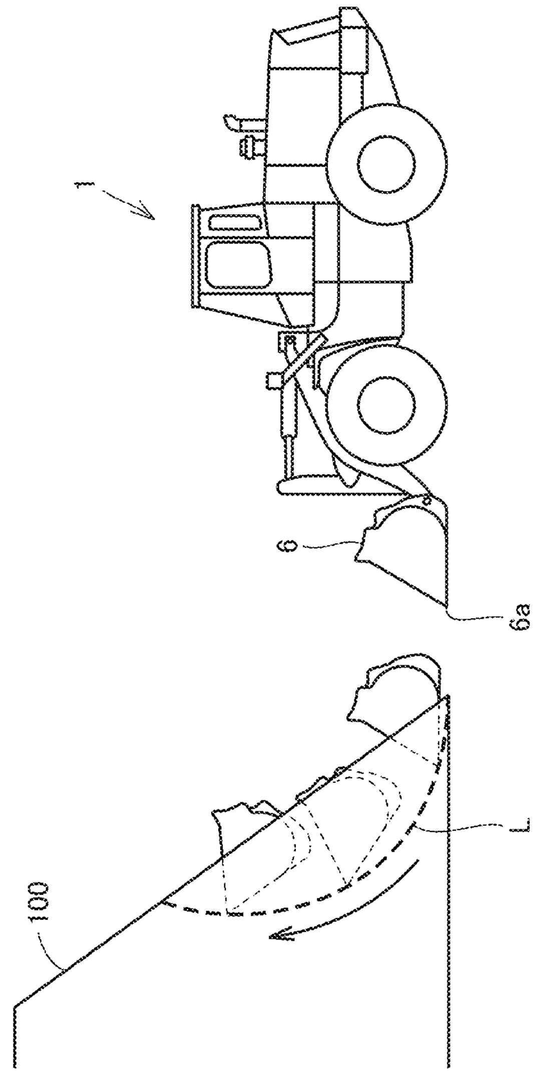
FIG. 3 illustrates an excavation work by the wheel loader based on the embodiment.

Wheel loader 1 in the present embodiment performs an excavation work for scooping an excavated object such as soil. FIG. 3 illustrates an excavation work by wheel loader 1 based on the embodiment.

As shown in FIG. 3, wheel loader 1 pushes cutting edge 6*a* of bucket 6 into an excavated object 100 and thereafter raises bucket 6 along a bucket trace L as shown with a curved arrow in FIG. 3. The excavation work for scooping excavated object 100 is thus performed.

Figure 4:
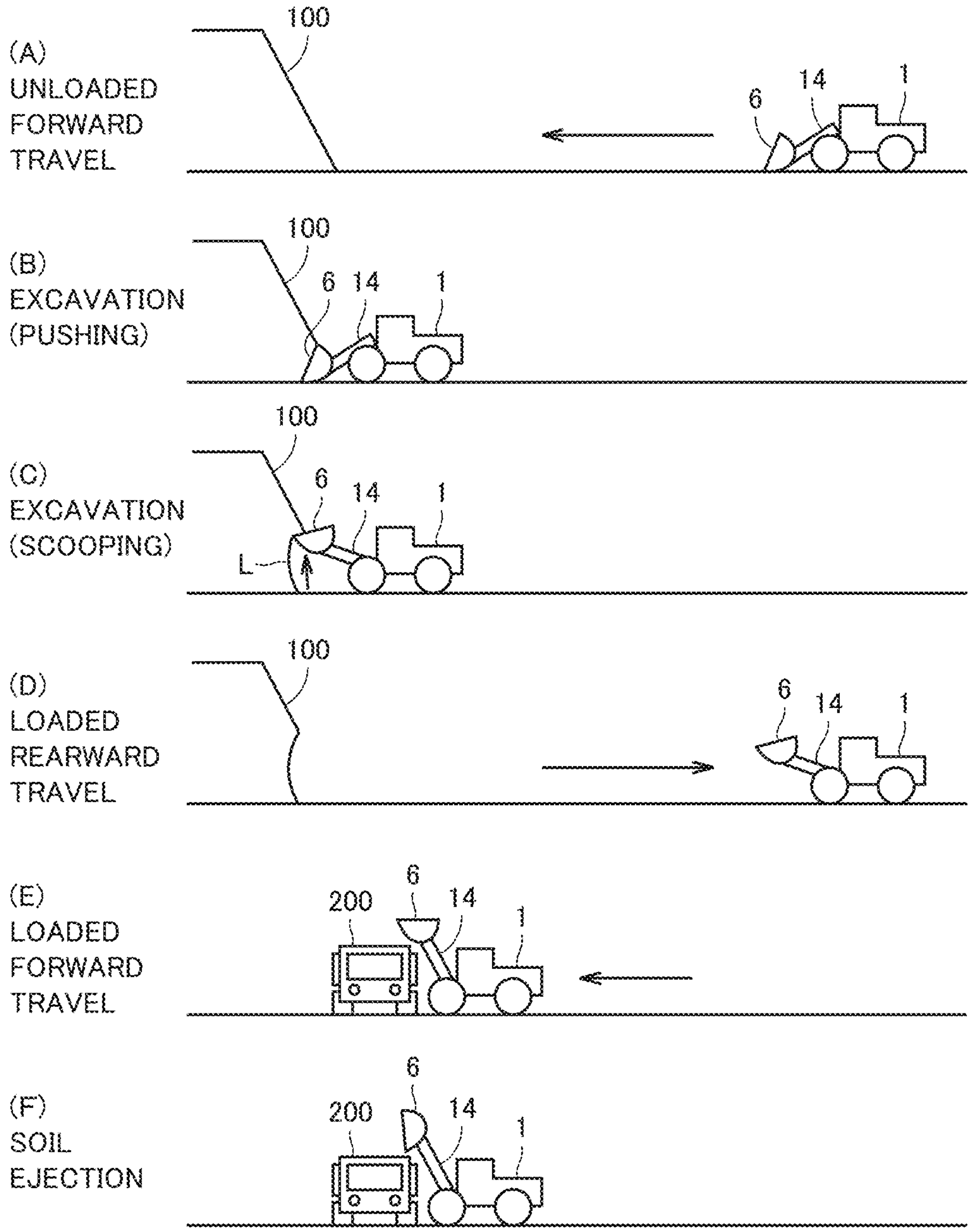
FIG. 4 is a schematic diagram showing an example of a series of work steps included in an excavation operation and a loading operation by the wheel loader.

Wheel loader 1 in the present embodiment performs an excavation operation for scooping excavated object 100 in bucket 6 and a loading operation for loading objects (excavated object 100) in bucket 6 onto a transportation machine such as a dump truck 200. FIG. 4 is a schematic diagram showing an example of a series of work steps included in an excavation operation and a loading operation by wheel loader 1 based on the embodiment. Wheel loader 1 excavates excavated object 100 and loads excavated object 100 on a transportation machine such as dump truck 200 by successively repeating a plurality of works steps as follows.

As shown in FIG. 4 (A), wheel loader 1 travels forward toward excavated object 100. In this unloaded forward travel step, an operator operates boom cylinder 16 and tilt cylinder 19 to set work implement 3 to an excavation attitude in which the tip end of boom 14 is located at a low position and bucket 6 is horizontally oriented, and moves wheel loader 1 forward toward excavated object 100.

As shown in FIG. 4 (B), the operator moves wheel loader 1 forward until cutting edge 6*a* of bucket 6 is pushed into excavated object 100. In this excavation (pushing) step, cutting edge 6*a* of bucket 6 is pushed into excavated object 100.

As shown in FIG. 4 (C), the operator thereafter operates boom cylinder 16 to raise bucket 6 and operates tilt cylinder 19 to tilt back bucket 6. In this excavation (scooping) step, bucket 6 is raised along bucket trace L as shown with an arrow in the figure and excavated object 100 is scooped into bucket 6. An excavation work for scooping excavated object 100 is thus performed.

Depending on a type of excavated object 100, the scooping step may be completed simply by tilting back bucket 6 once. Alternatively, in the scooping step, an operation to tilt back bucket 6, set the bucket to a neutral position, and tilt back the bucket again may be repeated.

As shown in FIG. 4 (D), after excavated object 100 is scooped into bucket 6, the operator moves wheel loader 1 rearward in a loaded rearward travel step. The operator may raise the boom while moving the vehicle rearward, or may raise the boom while moving the vehicle forward in FIG. 4 (E).

As shown in FIG. 4 (E), the operator moves wheel loader 1 forward to be closer to dump truck 200 while keeping bucket 6 raised or raising bucket 6. As a result of this loaded forward travel step, bucket 6 is located substantially directly above a box of dump truck 200.

As shown in FIG. 4 (F), the operator dumps the excavated object from bucket 6 at a prescribed position and loads objects (excavated object) in bucket 6 on the box of dump truck 200. This step is what is called a soil ejection step. Thereafter, the operator lowers boom 14 and returns bucket 6 to the excavation attitude while the operator moves wheel loader 1 rearward.

The above is typical work steps defining one cycle of the excavation and loading work.

FIG. 5 shows a table showing a determination method in the series of work steps included in the excavation operation and the loading operation by wheel loader 1.

In the table shown in FIG. 5, a row of "work step" at the top lists names of work steps shown in FIG. 4 (A) to (F). In rows of "forward and rearward travel switching lever," "operation of work implement," and "pressure of cylinder of work implement" below, various criteria used by first processor 30 (FIG. 2) for determining under which step a current work step falls are shown.

More specifically, in the row of "forward and rearward travel switching lever," criteria for an operation performed by an operator onto a forward and rearward travel switching lever (operation member 49*a*) are shown with a circle.

In the row of "operation of work implement," criteria for an operation by an operator onto work implement 3 are shown with a circle. More specifically, in a row of "boom", criteria for an operation onto boom 14 are shown, and in a row of "bucket", criteria for an operation onto bucket 6 are shown.

In the row of "pressure of cylinder of work implement," criteria for a current hydraulic pressure of the cylinder of work implement 3 such as a hydraulic pressure of a cylinder bottom chamber of boom cylinder 16 are shown. Four reference values A, B, C, and P are set in advance for a hydraulic pressure, a plurality of pressure ranges (a range lower than reference value P, a range of reference values A to C, a range of reference values B to P, and a range lower than reference value C) are defined by reference values A, B, C, and P, and these pressure ranges are set as the criteria. Magnitude of four reference values A, B, C, and P is defined as A>B>C>P.

By using at least one of criteria for "forward and rearward travel switching lever," "boom", "bucket", and "pressure of cylinder of work implement" for each work step as above, first processor 30 can determine under which work step a currently performed work falls.

A specific operation of first processor 30 when control shown in FIG. 5 is carried out will be described below.

Criteria for "forward and rearward travel switching lever," "boom", "bucket", and "pressure of cylinder of work implement" corresponding to each work step shown in FIG. 5 are stored in advance in a storage 30*j* (FIG. 2). First processor 30 recognizes a type (F, N, or R) of a current operation onto the forward and rearward travel switching lever based on a signal from forward and rearward travel switching apparatus 49. First processor 30 recognizes a type of a current operation onto boom 14 (lower, neutral, or raise) based on a signal from boom operation detection unit 52*b*. First processor 30 recognizes a type of a current operation onto bucket 6 (dump, neutral, or tilt back) based on a signal from bucket operation detection unit 54*b*. First processor 30 recognizes a current hydraulic pressure of the cylinder bottom chamber of boom cylinder 16 based on a signal from pressure sensor 28*b* shown in FIG. 2.

First processor 30 compares the recognized type of operation onto the forward and rearward travel switching lever, the type of the operation onto the boom, the type of the operation onto the bucket, and the hydraulic pressure of the boom cylinder at the current time point (that is, a current state of work) with criteria for "forward and rearward travel switching lever," "boom", "bucket", and "pressure of cylinder of work implement" corresponding to each work step stored in advance. As a result of this comparison processing, first processor 30 determines to which work step the criteria which match best with the current state of work correspond.

The criteria corresponding to each work step included in the excavation and loading operation shown in FIG. 5 are specifically as follows.

In the unloaded forward travel step, the forward and rearward travel switching lever is set to F, the operation of the boom and the operation of the bucket are both set to neutral, and the pressure of the cylinder of the work implement is lower than reference value P.

In the excavation (pushing) step, the forward and rearward travel switching lever is set to F, the operation of the boom and the operation of the bucket are both neutral, and the pressure of the cylinder of the work implement is within the range of reference values A to C.

In the excavation (scooping) step, the forward and rearward travel switching lever is set to F or R, the operation of the boom is raise or neutral, the operation of the bucket is tilt back, and the pressure of the cylinder of the work implement is within the range of reference values A to C. For an operation of the bucket, such a criterion that tilt back and neutral are alternately repeated may further be added because, depending on a state of excavated object 100, an operation to tilt back bucket 6, set the bucket to a neutral position, and tilt back the bucket again may be repeated.

In the loaded rearward travel step, the forward and rearward travel switching lever is set to R, the operation of the boom is neutral or raise, the operation of the bucket is neutral, and the pressure of the cylinder of the work implement is within the range of reference values B to P.

In the loaded forward travel step, the forward and rearward travel switching lever is set to F, the operation of the boom is raise or neutral, the operation of the bucket is neutral, and the pressure of the cylinder of the work implement is within the range of reference values B to P.

In the soil ejection step, the forward and rearward travel switching lever is set to F, the operation of the boom is raise or neutral, the operation of the bucket is dump, and the pressure of the cylinder of the work implement is within the range of reference values B to P.

In the rearward travel • boom lowering step, the forward and rearward travel switching lever is set to R, the operation of the boom is lower, the operation of the bucket is tilt back, and the pressure of the cylinder of the work implement is lower than reference value P.

FIG. 5 further shows a simple travel step in which wheel loader 1 simply travels. In the simple travel step, the operator moves wheel loader 1 forward with boom 14 being located at a low position. The wheel loader may transport loads with bucket 6 being loaded, or the wheel loader may travel with bucket 6 being unloaded. In the simple travel step, the forward and rearward travel switching lever is set to F (in travel forward; set to R in travel rearward), the operation of the boom is neutral, the operation of the bucket is neutral, and the pressure of the cylinder of the work implement is lower than reference value C.

<Piling Work>

Figure 6:
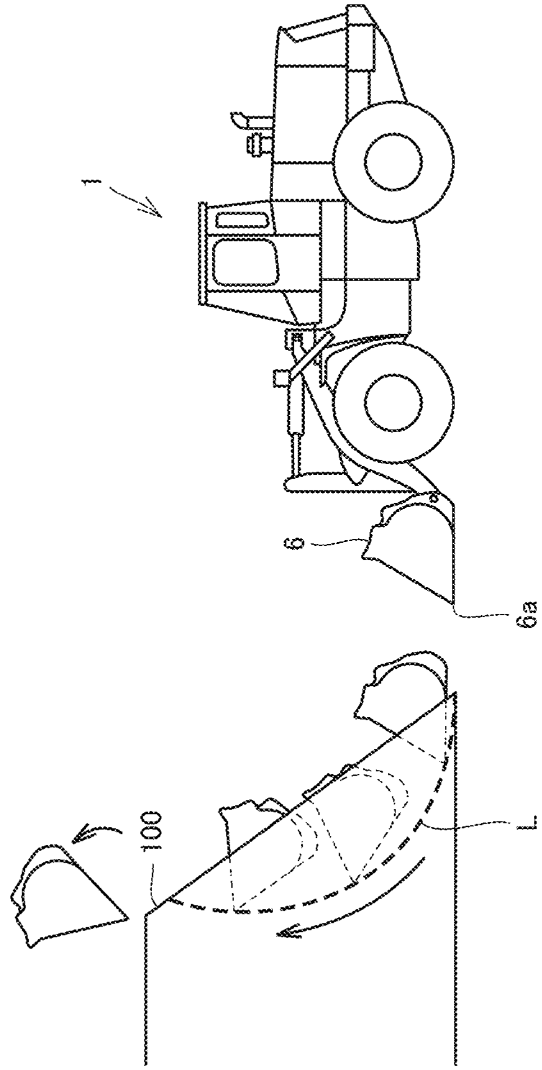
FIG. 6 is a diagram illustrating a piling work by the wheel loader based on the embodiment.

Wheel loader 1 in the present embodiment performs a piling work in which excavated object 100 such as soil scooped into bucket 6 is ejected at the site and piled up. FIG. 6 is a diagram illustrating a piling work by wheel loader 1 based on the embodiment.

As shown in FIG. 6, wheel loader 1 pushes cutting edge 6*a* of bucket 6 into excavated object 100 and thereafter raises bucket 6 along bucket trace L as shown with a curved arrow in FIG. 6. Wheel loader 1 further causes bucket 6 to perform a dumping operation. The piling work in which excavated object 100 scooped in bucket 6 is ejected at the site and piled up is thus performed.

In the piling work, the dumping operation by bucket 6 is performed at the end of the work. Therefore, the position of boom 14 at the end of the work is often higher than in the excavation and loading work. In performing the piling work, wheel loader 1 may go up the slope of the pile of excavated object 100 so as to eject excavated object 100 scooped into bucket 6 at a higher position.

<Dozing Work>

Figure 7:
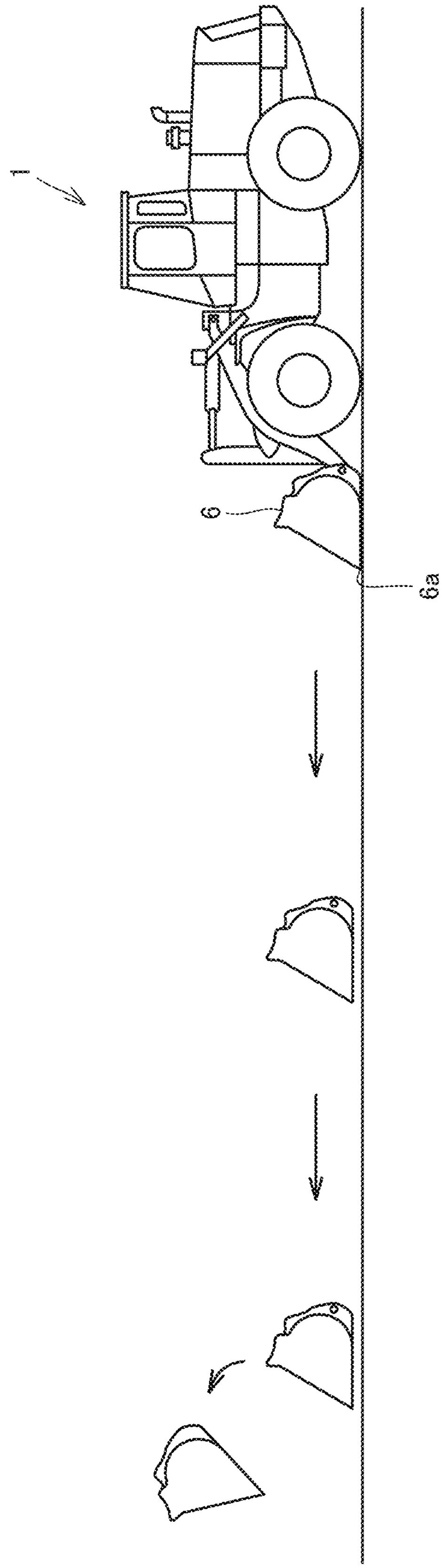
FIG. 7 is a diagram illustrating a dozing work by the wheel loader based on the embodiment.

Wheel loader 1 in the present embodiment performs a dozing (land grading) work for leveling the ground by traveling with cutting edge 6*a* of bucket 6 being located around the ground. FIG. 7 is a diagram illustrating a dozing work by wheel loader 1 based on the embodiment.

As shown in FIG. 7, after bucket 6 is arranged such that cutting edge 6*a* is located around the ground, wheel loader 1 travels forward as shown with an arrow in FIG. 7. The dozing work for land grading by leveling of the ground by cutting edge 6*a* of bucket 6 is thus performed. At the end of the dozing work, in order to eject soil that has entered bucket 6, bucket 6 may be caused to perform the dumping operation.

<Distinction of Work Contents>

Figure 8:
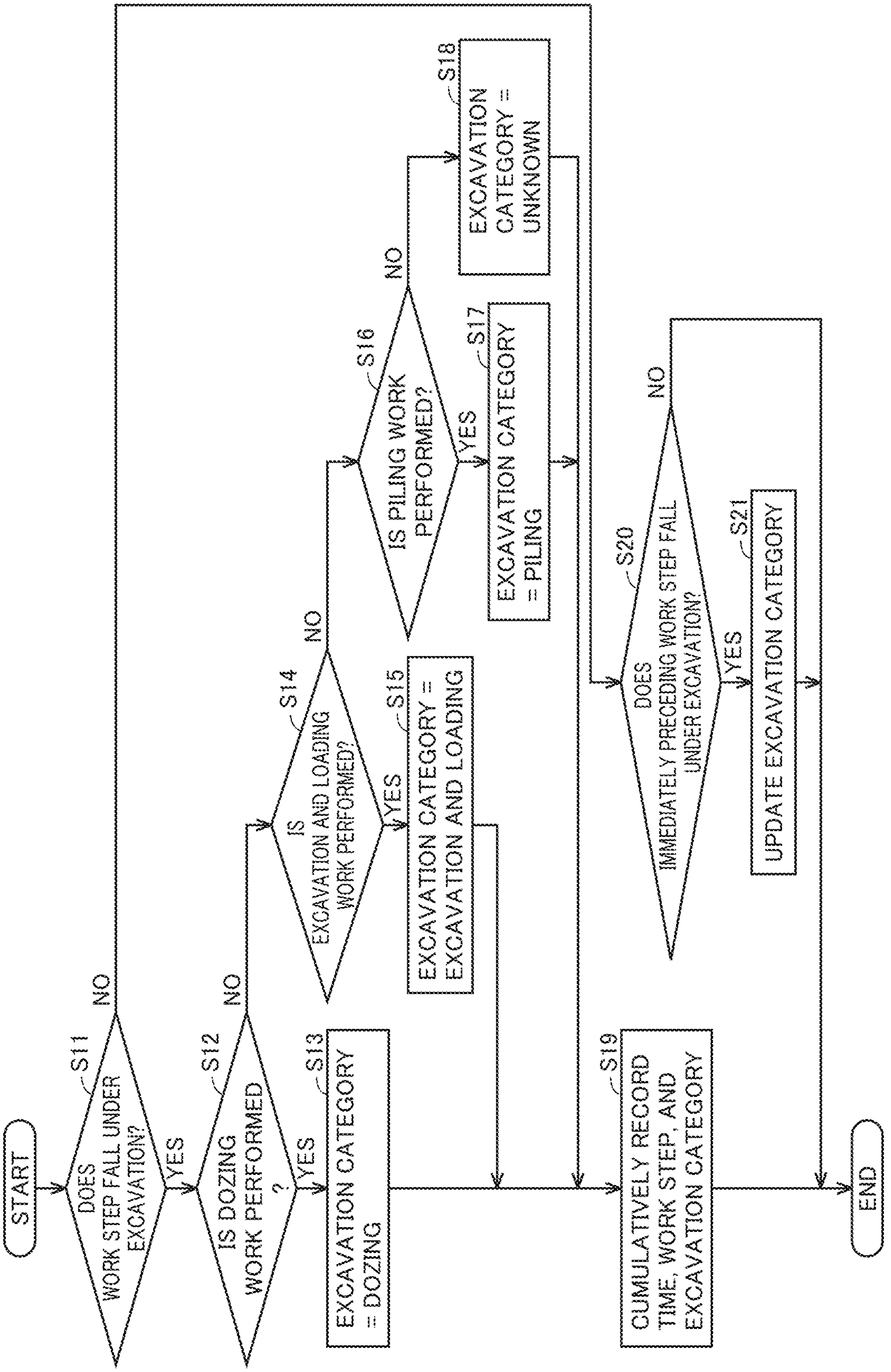
FIG. 8 is a flowchart showing processing for categorization of excavation in a first processor.

In wheel loader 1 in the present embodiment, first processor 30 determines under which of dozing, piling, and excavation and loading contents of works by work implement 3 fall. Such distinction among contents of works is defined as categorization of excavation. For example, categorization of excavation can be used in detailed analysis of an excavation work. FIG. 8 is a flowchart showing processing for categorization of excavation in first processor 30.

As shown in FIG. 8, initially in step S11, whether or not the work step falls under excavation is determined. First processor 30 compares a type of operation onto the forward and rearward travel switching lever, a type of operation onto the boom, a type of operation onto the bucket, and a hydraulic pressure of the boom cylinder at the current time point (that is, a current state of work) with criteria for "forward and rearward travel switching lever," "boom", "bucket", and "pressure of cylinder of work implement" corresponding to each work step stored in advance as described with reference to FIGS. 4 and 5 and determines whether or not the current work step falls under excavation.

For example, while the forward and rearward travel switching lever is set to F and an operation for travel forward of wheel loader 1 is being performed, first processor 30 may determine that the excavation work is being performed. Alternatively, first processor 30 may determine that the excavation work is being performed based on combination of setting of the forward and rearward travel switching lever to F with another criterion such as the pressure of the cylinder of the work implement being equal to or higher than reference value C.

When the work step is determined as falling under excavation (YES in step S11), the excavation work is categorized in steps S12, S14, and S16. Specifically, under which of dozing, piling, and excavation and loading the excavation work falls is determined. Processing in steps S12, S14, and S16 is performed every sampling period of first processor 30, that is, in real time.

Figure 9:
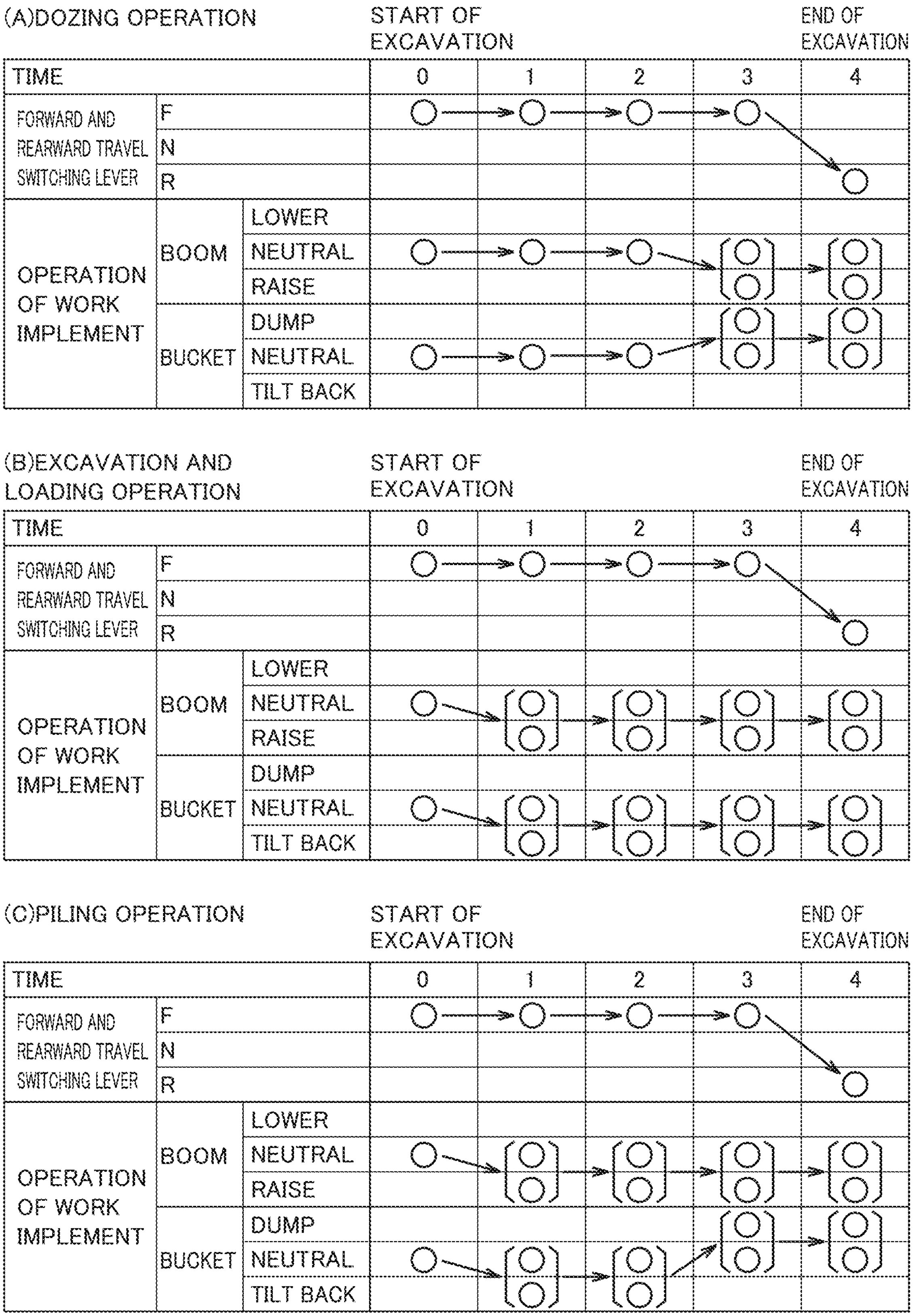
FIG. 9 shows a table for distinguishing contents of works by the wheel loader.

In step S12, whether or not a dozing work is being performed in the work step determined as falling under excavation is initially determined. FIG. 9 shows a table for distinguishing contents of works by wheel loader 1. FIG. 10 shows a graph of a trace of cutting edge 6*a* of bucket 6 during works by wheel loader 1. The abscissa in FIG. 10 (1) represents a trace of cutting edge 6*a* (cutting edge trace X, unit of m) of bucket 6 in a horizontal direction and the ordinate in FIG. 10 (1) represents a trace of cutting edge 6*a* (cutting edge trace Y, unit of m) of bucket 6 in a vertical direction. The abscissa in FIG. 10 (2) represents cutting edge trace X as in FIG. 10 (1) and the ordinate in FIG. 10 (2) represents a bucket angle (unit of °) described with reference to FIGS. 1 and 2.

FIG. 9 (A) shows a table for determining whether or not contents of works by wheel loader 1 fall under the dozing work. A curve (A) in FIG. 10 (1) shows exemplary relation between horizontal cutting edge trace X and vertical cutting edge trace Y during the dozing work. A curve (A) in FIG. 10 (2) shows exemplary relation between horizontal cutting edge trace X and a bucket angle during the dozing work.

As described with reference to FIG. 7, wheel loader 1 travels forward with cutting edge 6*a* of bucket 6 being arranged around the ground while it performs the dozing work. A height of vertical upward movement of cutting edge 6*a* during the dozing work is considerably smaller than a length of horizontal movement of cutting edge 6*a* with travel of wheel loader 1. As shown with the curve (A) in FIG. 11 (1), it can be seen that cutting edge trace X is longer than cutting edge trace Y in the dozing work, as compared with the cutting edge trace in the piling work or the excavation and loading work which will be described later.

Then, whether or not work contents fall under the dozing work is determined based on cutting edge trace X and cutting edge trace Y. Specifically, a coordinate of cutting edge trace X and cutting edge trace Y at a position of cutting edge 6*a* of bucket 6 at the end of the work is compared with a table where relation between cutting edge trace X and cutting edge trace Y is stored so that whether or not the work contents fall under the dozing work is determined.

More specifically, when the coordinate of cutting edge trace X and cutting edge trace Y at the position of cutting edge 6*a* of bucket 6 at the end of the work is included within a range in the table in which distinction as the dozing work is made, distinction as the dozing work is made. For example, when the position of cutting edge 6*a* of bucket 6 is close to the ground relative to the travel distance of wheel loader 1 and an operation to raise boom 14 is not performed or when the operation to raise boom 14 is performed but an amount of upward movement is small, the work contents are distinguished as the dozing work.

Alternatively, whether or not work contents fall under the dozing work can be determined also simply by comparing cutting edge trace X with a prescribed value without using cutting edge trace Y. For example, when a value of the coordinate of cutting edge trace X at the position of cutting edge 6*a* of bucket 6 at the end of the work is equal to or larger than a prescribed value, a travel distance of wheel loader 1 until the end of the work is long, and in this case, the work contents are distinguished as the dozing work.

In order to eject soil at the end of the dozing work, as shown in FIG. 9 (A), after boom 14 is once raised, bucket 6 is operated to perform dumping. Whether or not work contents fall under the dozing work may be determined based on change in operation onto the forward and rearward travel switching lever, change in operation onto the boom, change in operation onto the bucket, change in cutting edge trace X, change in cutting edge trace Y, change in bucket angle, or combination thereof.

When the work contents are distinguished as dozing in step S12 in FIG. 8 (YES in step S12), the process proceeds to step S13 and the work contents are stored with the excavation category being defined as dozing.

When the work contents are not distinguished as dozing in step S12 (NO in step S12), the process proceeds to step S14 and whether or not the excavation and loading work is being performed is determined. FIG. 9 (B) shows a table for determining whether or not contents of works by wheel loader 1 fall under the excavation and loading work. A curve (B) in FIG. 10 (1) represents exemplary relation between horizontal cutting edge trace X and vertical cutting edge trace Y during the excavation and loading work. A curve (B) in FIG. 10 (2) shows exemplary relation between horizontal cutting edge trace X and a bucket angle during the excavation and loading work.

When excavation and loading shown in FIG. 3 is performed, in order to scoop soil, a tilt back operation is performed during excavation as shown in the table in FIG. 9 (B). As shown with the curve (B) in FIG. 10 (2), a bucket angle is thus larger than in the piling work or the dozing work near the end of excavation.

Then, whether or not work contents fall under the excavation and loading work is determined based on a bucket angle. Specifically, whether or not work contents fall under the excavation and loading work is determined by comparing the bucket angle with a prescribed value. More specifically, when the bucket angle at the end of the work is larger than the prescribed value, work contents are distinguished as the excavation and loading work. Whether or not work contents fall under the excavation and loading work may be determined based on change in operation onto the forward and rearward travel lever, change in boom angle, change in bucket angle, change in cutting edge trace, or combination thereof.

When the work contents are distinguished as excavation and loading in step S14 in FIG. 8 (YES in step S14), the process proceeds to step S15 and the work contents are stored with the excavation category being defined as excavation and loading.

When work contents are not distinguished as excavation and loading in step S14 (NO in step S14), the process proceeds to step S16 and whether or not a piling work is being performed is determined. FIG. 9 (C) shows a table for determining whether or not contents of works by wheel loader 1 fall under a piling work. A curve (C) in FIG. 10 (1) represents exemplary relation between horizontal cutting edge trace X and vertical cutting edge trace Y during the piling work. A curve (C) in FIG. 10 (2) represents exemplary relation between horizontal cutting edge trace X and a bucket angle during the piling work.

In piling, as shown in the table in FIG. 9 (C), the dumping operation for ejecting soil in bucket 6 is performed near the end of excavation. Then, whether or not work contents fall under a piling work is determined based on the dumping operation of bucket 6 during excavation.

The dumping operation is performed near the end of excavation. Therefore, as shown with the curve (C) in FIG. 10 (1), cutting edge trace Y changes from raising to lowering. Therefore, whether or not the work contents fall under the piling work may be determined based on cutting edge trace Y.

As shown with the curve (C) in FIG. 10 (2), a value of a bucket angle is smaller than in excavation and loading. Therefore, whether or not work contents fall under a piling work may be determined based on a bucket angle.

When work contents are distinguished as piling in step S16 in FIG. 9 (YES in step S16), the process proceeds to step S17 and the work contents are stored with the excavation category being defined as piling.

When work contents are not distinguished as piling in step S16 (NO in step S16), the process proceeds to step S18 and the work contents are stored with the excavation category being unknown.

Excavation is categorized as unknown, for example, immediately after start of excavation. As shown in FIG. 9 (A) to (C) and shown with the curves (A) to (C) in FIG. 10, at a time point of start of excavation, there is no great difference in operation by the work implement among excavation and loading, piling, and dozing, and hence the excavation category may be determined as unknown.

As shown in FIGS. 9 and 10, a difference among dozing, excavation and loading, and piling becomes noticeable near the end of excavation. Therefore, an operation onto the forward and rearward travel switching lever may be added to the criteria as a condition for recognizing that excavation is in the last stage.

Based on data on distinction about the excavation category calculated in real time in steps S12 to S18 in FIG. 8, time, the work step, and the excavation category are cumulatively recorded in step S19. First processor 30 has storage 30*j* store the time of start of the work and the time of end of the work with reference to a timer 30*t* (FIG. 2). First processor 30 has storage 30*j* store work contents distinguished as having been performed within a period between them.

When the work step is not determined as falling under excavation (NO in step S11), whether or not the immediately preceding work step falls under excavation is determined in step S20. In step S20, whether or not the work step has proceeded from excavation to a work step other than excavation (excavation has ended) is determined.

When the immediately preceding work step is determined as excavation in step S20 (YES in step S20), the excavation category during a period from transition of the work step from a work step other than excavation to excavation until transition of the work step from excavation to a work step other than excavation, that is, from start of excavation until end of excavation, is updated in step S21.

Under which of dozing, piling, and excavation and loading contents of works by work implement 3 fall is thus determined (end in FIG. 8).

Categorization of excavation described with reference FIGS. 8 to 10 is exemplary means for determining whether or not work contents fall under excavation and it is not limited as such. For example, a result of detection by a position sensor that detects a position of work implement 3, specifically, first angle detector 29 and second angle detector 48 shown in FIGS. 1 and 2, may be used to calculate change over time in positions of boom 14 and bucket 6 and to distinguish work contents. In addition to an example in which a state of wheel loader 1 is detected based on a signal from a sensor mounted on wheel loader 1, for example, a sensor provided outside wheel loader 1 such as a camera (an image pick-up apparatus) for image pick-up of wheel loader 1 from the outside may be used to detect a state of wheel loader 1 and to distinguish contents of works by work implement 3.

<Control at the Time when Ineffective Operation is Performed>

In wheel loader 1 in the present embodiment, first processor 30 determines whether or not an ineffective operation in which work implement 3 is not working is being performed within a time period for which determination of the work step as excavation has been made. When first processor 30 determines that the ineffective operation is being performed, it controls the wheel loader to cancel the ineffective operation.

For example, work implement stall and slip-during-excavation represent examples of the ineffective operation. Work implement stall refers to a situation that cutting edge 6*a* of bucket 6 enters excavated object 100 too deeply and boom 14 cannot actually be raised in spite of an operation of boom operation member 52*a* to raise boom 14 by an operator. Slip-during-excavation refers to a situation that, by not inputting an operation command for work implement 3 necessary for excavation during an excavation work, lifting force is insufficient and running wheels 4*a* and 4*b* slip with respect to the ground, in particular, a situation of idle rotation of running wheel 4*a* that defines the front wheel of wheel loader 1.

Figure 11:
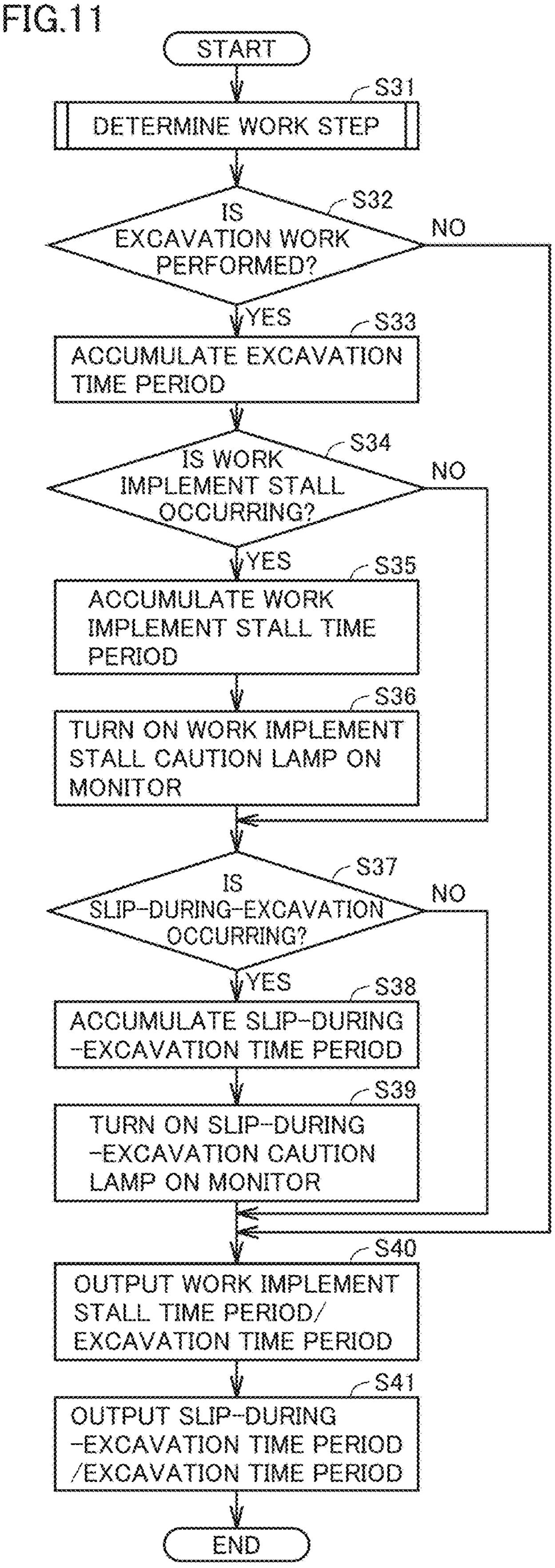
FIG. 11 is a flowchart showing control processing performed when an ineffective operation is performed.

FIG. 11 is a flowchart showing a flow of control processing performed when an ineffective operation is performed. As shown in FIG. 11, initially in step S31, a work step is determined. In determination of a work step corresponding to step S11 in FIG. 8, whether or not a current work step falls under excavation is determined.

Then, in step S32, whether or not the work step has been determined as excavation as a result of determination in step S31 is determined. When the work step has been determined as excavation (YES in step S32), the process proceeds to step S33 and a time period for excavation is calculated.

First processor 30 reads from timer 30*t*, time (T0) at the time point of start of the work. First processor 30 further reads the current time (T1) from timer 30*t*. First processor 30 calculates a time period (T=T1−T0) elapsed between the time at the time point of start of the work and the current time and defines the elapsed time period as an excavation time period. First processor 30 continues calculation of the excavation time period until the work ends. First processor 30 accumulates the excavation time period by adding the excavation time period in the present work to the excavation time periods until completion of the previous work.

Figure 12:
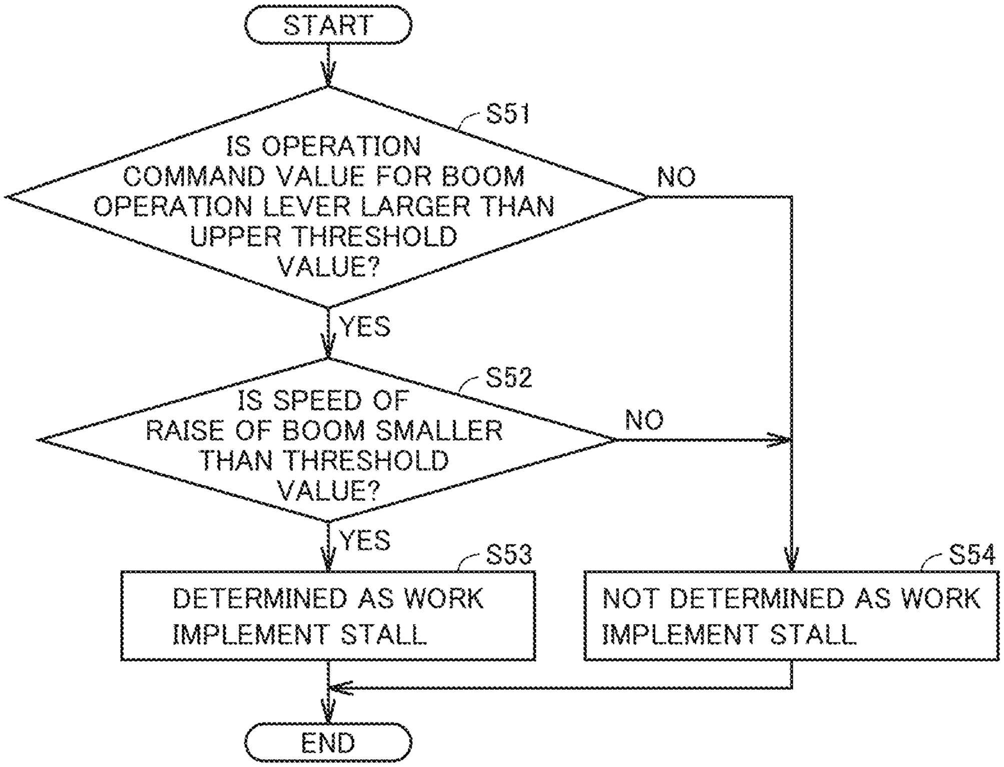
FIG. 12 is a flowchart showing processing for determining whether or not work implement stall is occurring.

Then, in step S34, whether or not work implement stall is occurring is determined. FIG. 12 is a flowchart showing processing for determining whether or not work implement stall is occurring.

In order to determine whether or not work implement stall is occurring, as shown in FIG. 12, initially in step S51, whether or not an operation command value for operating boom 14 output from boom operation apparatus 52 is larger than an upper threshold value is determined.

The operation command value represents magnitude of a detection signal output from boom operation detection unit 52*b* to first processor 30 in accordance with an amount of operation of boom operation member 52*a* by an operator. The operation command value has an upper threshold value and a lower threshold value shown in FIG. 14 which will be described later. The upper threshold value is set as a threshold value larger than the lower threshold value. For example, the upper threshold value is set to a value close to a maximum value of the operation command value. The lower threshold value is set to a value close to a minimum value of the operation command value. When the operation command value ranges from 0% to 100%, for example, 80% may be set as the upper threshold value and 5% may be set as the lower threshold value.

When the operation command value is larger than the upper threshold value (YES in step S51), then in step S52, whether or not a speed of raise of boom 14 is smaller than a threshold value is determined. The speed of raise of boom 14 can be obtained, for example, based on an angular velocity obtained by differentiating a value of a boom angle detected by first angle detector 29 (FIGS. 1 and 2) by time. As shown in FIGS. 5 and 9 (B), an operation to raise boom 14 is performed during the excavation work. Therefore, determination as to a speed of raise of boom 14 is made in step S52.

Since work implement stall refers to the situation in which boom 14 is not raised as described above, the threshold value for the speed of raise of boom 14 is set to a value close to the minimum value of the set value for the speed of raise. When the speed of raise of boom 14 ranges from 0% to 100%, the threshold value may be set, for example, to 5%.

When the speed of raise of boom 14 is smaller than the threshold value (YES in step S52), boom 14 is not actually raised in spite of determination that an amount of operation by the operator to attempt to perform an operation to raise boom 14 is large. In this case, the process proceeds to step S53 and determination as occurrence of work implement stall is made.

When the operation command value for boom 14 is equal to or smaller than the upper threshold value (NO in step S51) and when the speed of raise of boom 14 is equal to or larger than the threshold value (NO in step S52), the process proceeds to step S54 and determination as work implement stall not occurring is made. Whether or not work implement stall is occurring is thus determined (end in FIG. 12).

Referring back to FIG. 11, when it is determined that work implement stall is occurring (YES in step S34), the process proceeds to step S35 and a time period for work implement stall is calculated.

First processor 30 reads from timer 30*t*, time (T2) of start of determination that work implement stall is occurring. First processor 30 reads from timer 30*t*, time (T3) at which it is no longer determined that work implement stall is occurring, that is, the work implement has come out of stall. First processor 30 calculates a time period (T=T3−−T2) for which the work implement has stalled. First processor 30 accumulates the work implement stall time period by adding the time period for present work implement stall to the time periods for which the work implement stalled in excavation works until now.

Figure 13:
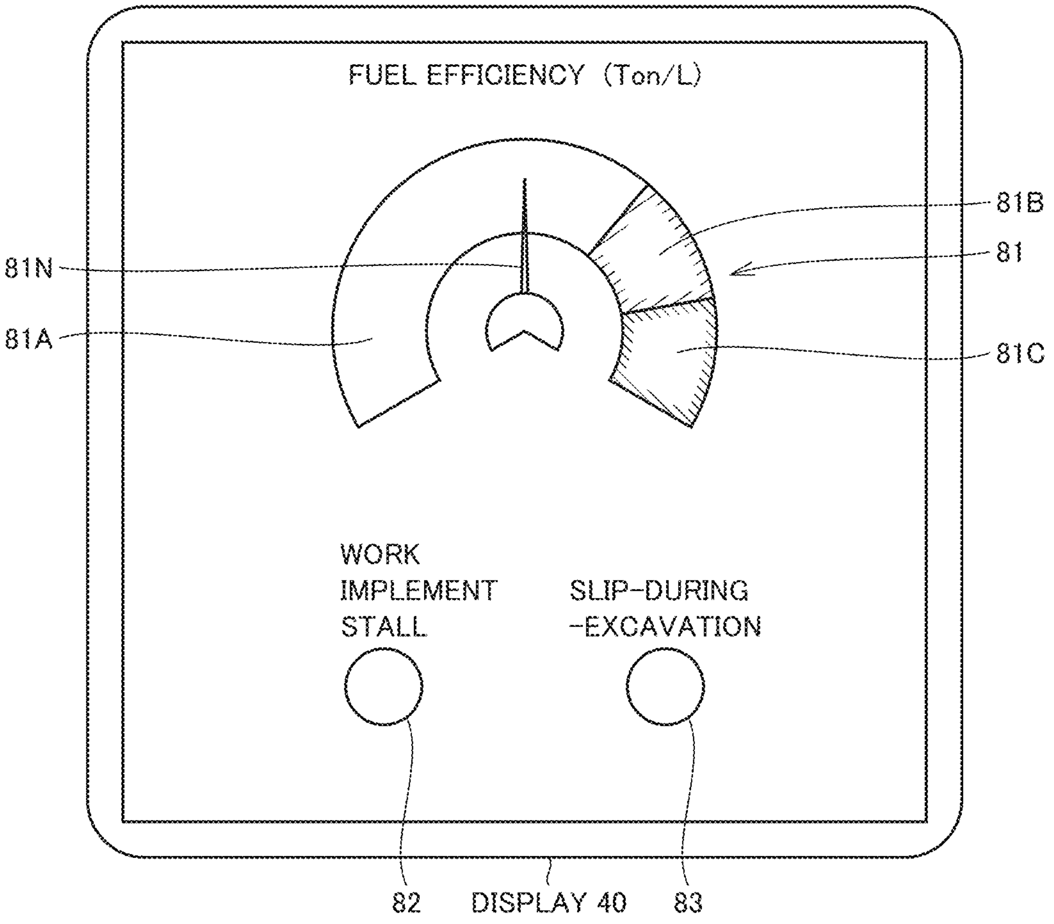
FIG. 13 is a schematic diagram showing a first example of representation on a display in a cab.

Then, in step S36, a work implement stall caution lamp 82 on a monitor (display 40) is turned on. FIG. 13 is a schematic diagram showing a first example of representation on display 40 (see also FIGS. 1 and 2) in cab 5.

Display 40 shown in FIG. 13 shows a fuel efficiency meter 81, work implement stall caution lamp 82, and a slip-during-excavation caution lamp 83. While work implement stall is occurring, first processor 30 transmits a command signal for turning on work implement stall caution lamp 82 to display 40. Display 40 that has received the command signal from first processor 30 turns on work implement stall caution lamp 82. Work implement stall caution lamp 82 is turned on while work implement stall is occurring and shows the situation that work implement stall is occurring on a screen of display 40. Work implement stall caution lamp 82 notifies an operator who is in cab 5 of occurrence of work implement stall.

Instead of or in addition to turn-on of work implement stall caution lamp 82, an audio signal may be emitted to notify the operator of occurrence of work implement stall while work implement stall is occurring.

The operator who has visually recognized turn-on of work implement stall caution lamp 82 and recognized occurrence of work implement stall performs an operation to come out of work implement stall. More specifically, the operator performs an operation to tilt back bucket 6. Even though work implement stall in which boom 14 cannot be raised occurs, load applied to bucket 6 by excavated object 100 at the time of the operation to tilt back bucket 6 is relatively low. By initially tilting back bucket 6 to lower load applied to work implement 3 at the time of occurrence of work implement stall, an operation to raise boom 14 can be performed. Therefore, the work implement can come out of stall.

Fuel efficiency meter 81 shown in FIG. 13 includes a needle-shaped portion 81N. Fuel efficiency meter 81 includes a first gauge area 81A, a second gauge area 81B, and a third gauge area 81C. First gauge area 81A, second gauge area 81B, and third gauge area 81C are set in the descending order of fuel efficiency. When fuel efficiency is relatively high, needle-shaped portion 81N is shown as being superimposed on first gauge area 81A. When fuel efficiency is poor and should be improved, needle-shaped portion 81N is shown as being superimposed on third gauge area 81C.

Needle-shaped portion 81N may be displaced based on a result of real-time detection of fuel efficiency or based on an average value of fuel efficiency within a prescribed time period or in prescribed number of times of work. First gauge area 81A, second gauge area 81B, and third gauge area 81C may be colored differently from one another. For example, first gauge area 81A may be colored in green, second gauge area 81B may be colored in yellow, and third gauge area 81C may be colored in red.

Figure 14:
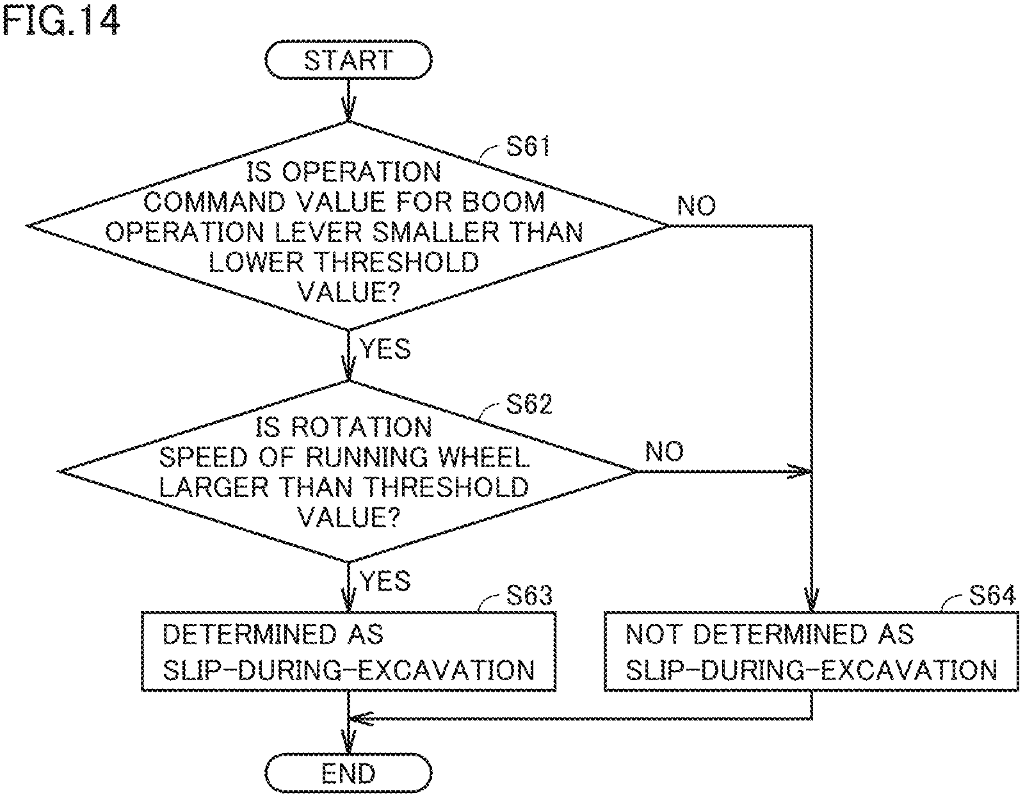
FIG. 14 is a flowchart showing processing for determining whether or not slip-during-excavation is occurring.

Referring back to FIG. 11, in step S37, whether or not slip-during-excavation is occurring is determined. When it is determined that work implement stall is not occurring (NO in step S34), processing in steps S35 and S36 is skipped, and determination in step S37 is made in succession to determination in step S34. FIG. 14 is a flowchart showing processing for determining whether or not slip-during-excavation is occurring.

In order to determine whether or not slip-during-excavation is occurring, as shown in FIG. 14, initially in step S61, whether or not an operation command value for operating boom 14 output from boom operation apparatus 52 is smaller than the lower threshold value is determined. The lower threshold value represents one of threshold values set for the operation command value and described in connection with the upper threshold value shown in FIG. 12.

When an operation to raise boom 14 is performed, reaction force applied against work implement 3 by excavated object 100 acts downward onto running wheel 4*a*, and hence slip of running wheel 4*a* is less likely. When the operation command value is smaller than the lower threshold value (YES in step S61), an amount of operation by the operator to attempt to perform an operation to raise boom 14 is small. In this case, slip may occur. As shown in FIGS. 5 and 9 (B), a work for scooping excavated object 100 into bucket 6 only by tilting back bucket 6 with boom 14 being maintained neutral may also be performed.

Then, in step S62, whether or not a rotation speed of running wheels 4*a* and 4*b* is higher than a threshold value is determined. The rotation speed of running wheels 4*a* and 4*b* can be obtained, for example, based on a rotation speed of output shaft 23*a* detected by vehicle speed detector 27.

When the rotation speed of running wheels 4*a* and 4*b* is larger than the threshold value (YES in step S62), an amount of operation by the operator to attempt to perform an operation to raise boom 14 is small and an amount of operation by the operator to have wheel loader 1 travel forward is large. In this case, the process proceeds to step S63 and it is determined that slip-during-excavation is occurring.

When the operation command value for boom 14 is equal to or larger than the lower threshold value (NO in step S61) and when the rotation speed of running wheels 4*a* and 4*b* is equal to or smaller than the threshold value (NO in step S62), the process proceeds to step S64 and it is determined that slip-during-excavation is not occurring. Whether or not slip-during-excavation is occurring is thus determined (end in FIG. 14).

Referring back to FIG. 11, when it is determined that slip-during-excavation is occurring (YES in step S37), the process proceeds to step S38 and a time period for slip-during-excavation is calculated.

First processor 30 reads from timer 30*t*, time (T4) of start of determination that slip-during-excavation is occurring. First processor 30 reads from timer 30*t*, time (T5) at which it is no longer determined that slip-during-excavation is occurring, that is, slip-during-excavation is eliminated. First processor 30 calculates a time period (T=T5−T4) for which slip-during-excavation has occurred. First processor 30 accumulates the slip-during-excavation time period by adding the time period of present slip-during-excavation to the time periods for which slip-during-excavation occurred in excavation works until now.

Then, in step S39, slip-during-excavation caution lamp 83 on the monitor (display 40) is turned on. Referring also to FIG. 13, while slip-during-excavation is occurring, first processor 30 transmits a command signal for turning on slip-during-excavation caution lamp 83 to display 40. Display 40 that has received the command signal from first processor 30 turns on slip-during-excavation caution lamp 83. Slip-during-excavation caution lamp 83 is turned on while slip-during-excavation is occurring and shows a situation that slip-during-excavation is occurring on the screen of display 40. Slip-during-excavation caution lamp 83 notifies an operator who is in cab 5 of occurrence of slip-during-excavation.

Instead of or in addition to turn-on of slip-during-excavation caution lamp 83, an audio signal may be emitted to notify the operator of occurrence of slip-during-excavation while slip-during-excavation is occurring. When an audio signal is used, audio signals different between occurrence of work implement stall and occurrence of slip-during-excavation are preferably emitted.

The operator who has visually recognized turn-on of slip-during-excavation caution lamp 83 and recognized occurrence of slip-during-excavation performs an operation to eliminate slip-during-excavation. More specifically, the operator performs an operation to raise boom 14. By raising boom 14, downward reaction force is applied to work implement 3 by excavated object 100. As reaction force is transmitted to running wheel 4*a*, running wheel 4*a* is pressed against the ground and friction force applied to a portion of contact between the ground and running wheel 4*a* increases. Therefore, running wheel 4*a* no longer runs idle with respect to the ground and slip-during-excavation is eliminated.

Then, in step S40, a time period for which work implement stall has occurred is output. In succession, in step S41, a time period for which slip-during-excavation has occurred is output. When it is determined that slip-during-excavation is not occurring (NO in step S37), processing in steps S38 and S39 is skipped, and processing in steps S40 and S41 is performed in succession to determination in step S37.

Figure 15:
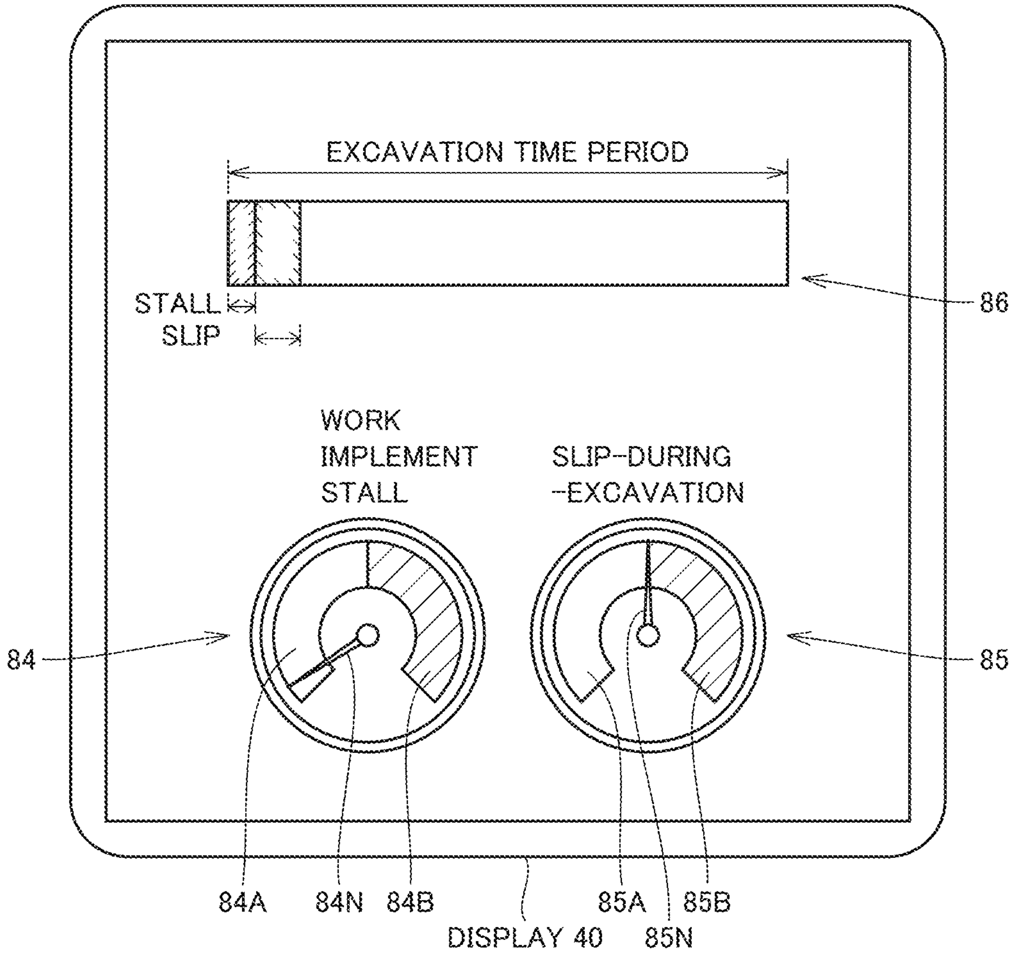
FIG. 15 is a schematic diagram showing a second example of representation on the display in the cab.

FIG. 15 is a schematic diagram showing a second example of representation on display 40 in cab 5. Display 40 shown in FIG. 15 shows a work implement stall indicator 84, a slip-during-excavation indicator 85, and a gauge 86. Gauge 86 shows a time period for which work implement stall has occurred and a time period for which slip-during-excavation has occurred within the entire excavation time period. Work implement stall indicator 84 and slip-during-excavation indicator 85 are indicators that visualize whether an excavation work is satisfactory or dissatisfactory based on a ratio of the ineffective operation that has occurred during excavation.

Work implement stall indicator 84 includes a needle-shaped portion 84N, a first area 84A, and a second area 84B. A boundary between first area 84A and second area 84B indicates an allowable limit of a time period for which work implement stall has occurred. Needle-shaped portion 84N shown as being superimposed on first area 84A means that a time period for which work implement stall has occurred is short and excavation has satisfactorily been performed. Needle-shaped portion 84N shown as being superimposed on second area 84B means that a time period for which work implement stall has occurred is long, efficiency in the excavation work is poor, and hence fuel efficiency is also poor. Work implement stall indicator 84 plays a role to urge an operator who visually recognizes display 40 to avoid work implement stall.

It should be noted that work implement stall indicator 84 does not show a time period for which work implement stall has occurred with respect to the total time period of excavation but shows comparison between an actual time period for which work implement stall has occurred and the allowable limit of work implement stall.

Slip-during-excavation indicator 85 includes a needle-shaped portion 85N, a first area 85A, and a second area 85B. A boundary between first area 85A and second area 85B indicates an allowable limit of a time period of occurrence of slip-during-excavation. Needle-shaped portion 85N shown as being superimposed on first area 85A means that a time period for which slip-during-excavation has occurred is short and excavation has satisfactorily been performed. Needle-shaped portion 85N shown as being superimposed on second area 85B means that a time period for which slip-during-excavation has occurred is long, efficiency in the excavation work is poor, and hence fuel efficiency is also poor. Slip-during-excavation indicator 85 plays a role to urge an operator who visually recognizes display 40 to avoid slip-during-excavation.

It should be noted that slip-during-excavation indicator 85 does not show a time period for which slip-during-excavation has occurred with respect to the total time period of excavation but shows comparison between an actual time period for which slip-during-excavation has occurred and the allowable limit of slip-during-excavation.

When it is determined in determination in step S32 that work contents do not fall under excavation (NO in step S32), processing in steps S33 to S39 is skipped, and output processing in steps S40 and S41 is performed. Then, the process ends (end in FIG. 11).

When an ineffective operation is performed, first processor 30 can thus output a command signal relating to an operation by the work implement. When it is determined that work implement stall is occurring based on the fact that the operation command value for operating boom 14 is larger than the upper threshold value, a command signal to turn on work implement stall caution lamp 82 can be output to display 40 as a signal relating to working of work implement 3. When it is determined that slip-during-excavation is occurring based on the fact that the operation command value for operating boom 14 is smaller than the lower threshold value, a command signal to turn on slip-during-excavation caution lamp 83 can be output to display 40 as a signal relating to working of the work implement.

Second Embodiment

Figure 16:
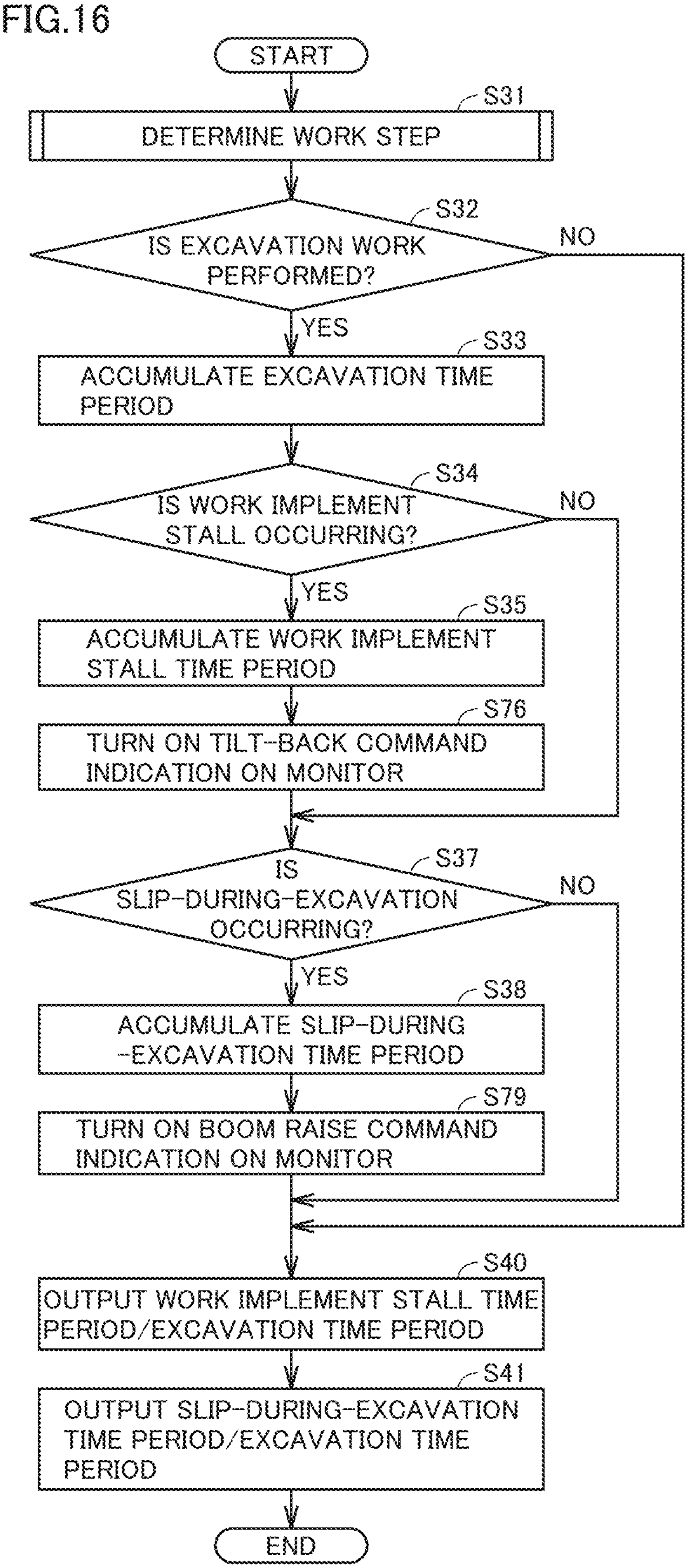
FIG. 16 is a flowchart showing control processing performed when an ineffective operation is performed based on a second embodiment.

FIG. 16 is a flowchart showing control processing performed when an ineffective operation is performed based on a second embodiment. Processing in the second embodiment shown in FIG. 16 is different from the processing in the first embodiment shown in FIG. 11 in that step S76 of turning on tilt-back command indication on the monitor (display 40) is included instead of step S36 and step S79 of turning on boom raise command indication on the monitor (display 40) is included instead of step S39.

Figure 17:
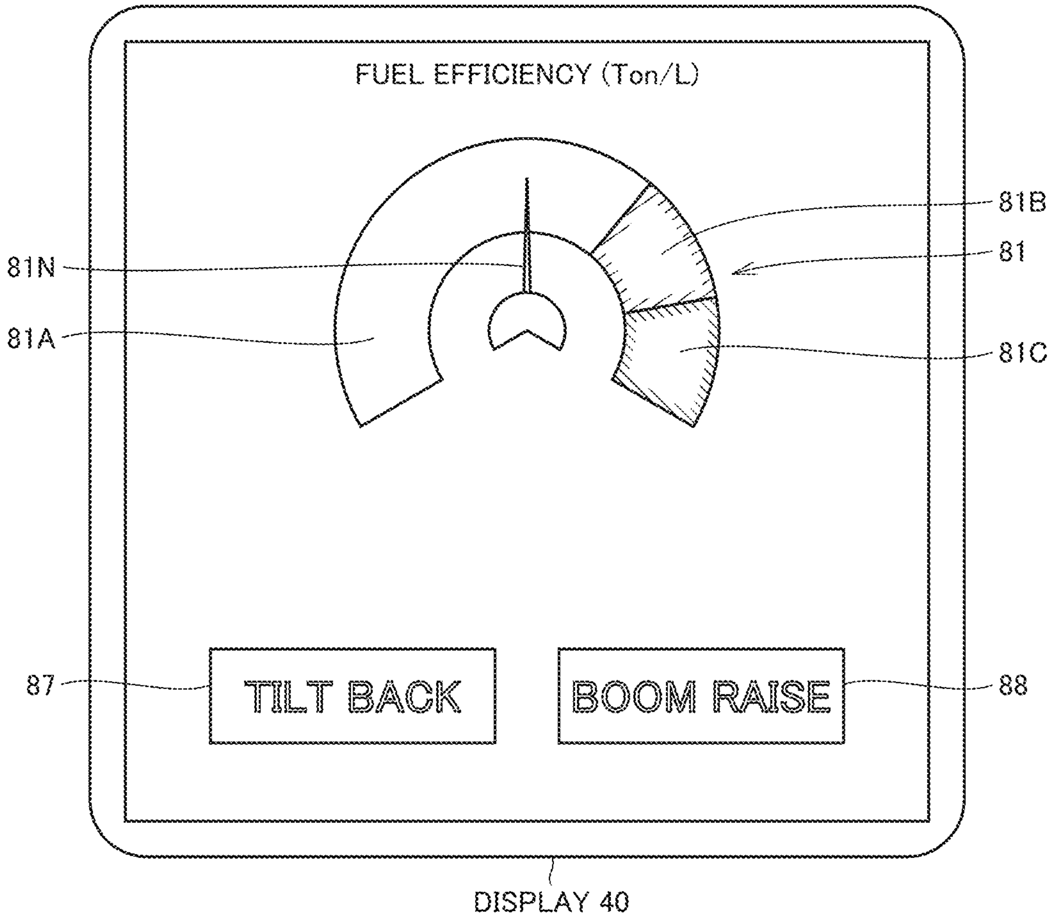
FIG. 17 is a schematic diagram showing a third example of representation on the display in the cab.

FIG. 17 is a schematic diagram showing a third example of representation on display 40 in cab 5. On display 40 shown in FIG. 17, fuel efficiency meter 81 as in FIG. 13, a tilt-back command lamp 87, and a boom raise command lamp 88 are shown.

When it is determined in determination in step S34 that work implement stall is occurring, first processor 30 transmits a command signal to turn on tilt-back command lamp 87 to display 40 while work implement stall is occurring. Display 40 that has received the command signal from first processor 30 turns on tilt-back command lamp 87. Tilt-back command lamp 87 is turned on while work implement stall is occurring and urges an operator who is in cab 5 to perform an operation to tilt back bucket 6.

The operator who has visually recognized turn-on of tilt-back command lamp 87 performs an operation to tilt back bucket 6. As described above, the work implement thus comes out of stall.

When it is determined in determination in step S37 that slip-during-excavation is occurring, first processor 30 transmits a command signal to turn on boom raise command lamp 88 to display 40 while slip-during-excavation is occurring. Display 40 that has received the command signal from the first processor turns on boom raise command lamp 88. Boom raise command lamp 88 is turned on while slip-during-excavation is occurring and urges an operator who is in cab 5 to perform an operation to raise the boom.

The operator who has visually recognized turn-on of boom raise command lamp 88 performs an operation to raise boom 14. Slip-during-excavation is thus eliminated as described above.

First processor 30 can thus output a command signal relating to an operation by the work implement when an ineffective operation is performed. When it is determined that work implement stall is occurring based on the fact that the operation command value for operating boom 14 is larger than the upper threshold value, a command signal to turn on tilt-back command lamp 87 can be output to display 40 as a signal relating to working of work implement 3. When it is determined that slip-during-excavation is occurring based on the fact that the operation command value for operating boom 14 is smaller than the lower threshold value, a command signal to turn on boom raise command lamp 88 can be output to display 40 as a signal relating to working of work implement 3.

Third Embodiment

Figure 18:
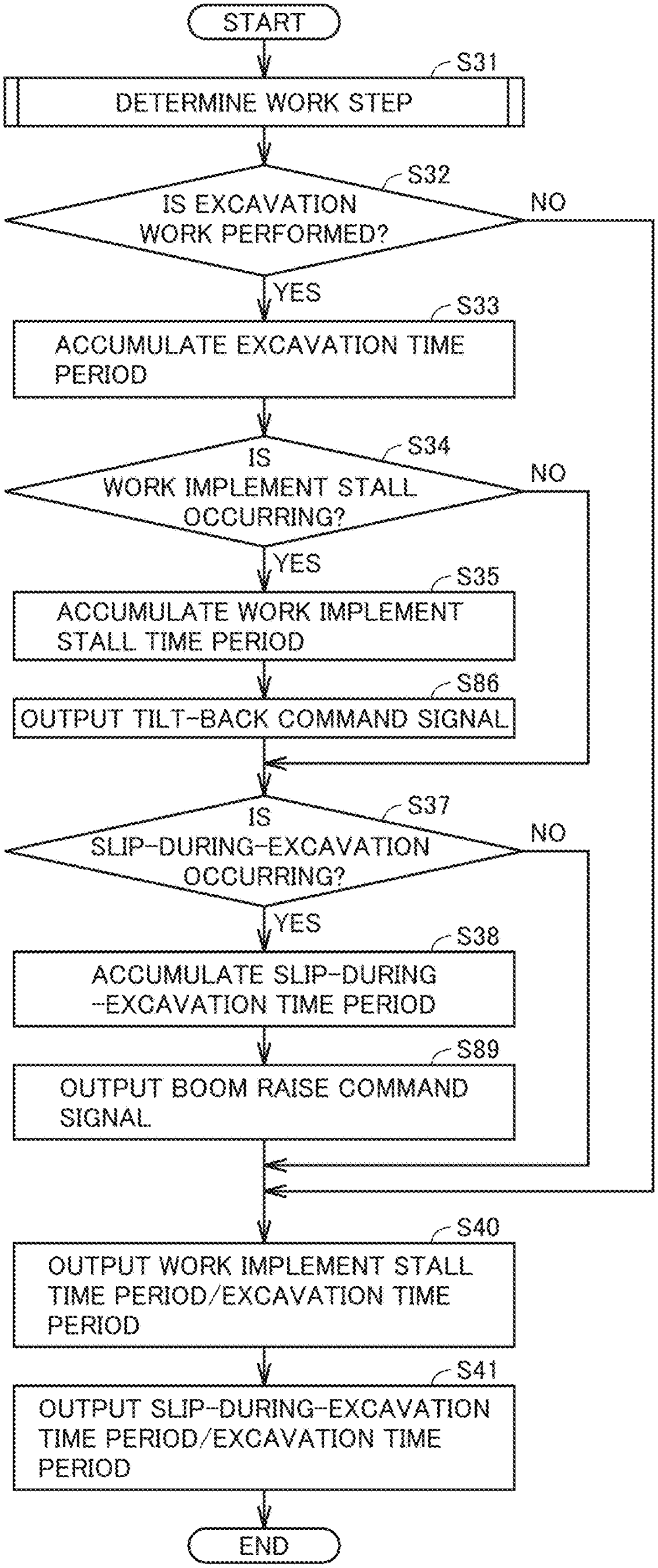
FIG. 18 is a flowchart showing control processing performed when an ineffective operation is performed based on a third embodiment.

FIG. 18 is a flowchart showing control processing performed when an ineffective operation is performed based on a third embodiment. Processing in the third embodiment shown in FIG. 18 is different from the processing in the first embodiment shown in FIG. 11 in that step S86 of outputting a tilt-back command signal is included instead of step S36 and step S89 of outputting a boom raise operation command is included instead of step S39.

When it is determined in determination in S34 that work implement stall is occurring, first processor 30 outputs a command signal to tilt back bucket 6. More specifically, first processor 30 outputs to control valve 26, a command signal to allow supply of hydraulic oil to a bottom-side oil chamber of tilt cylinder 19. As control valve 26 that has received the command signal allows supply of hydraulic oil to the bottom-side oil chamber of tilt cylinder 19, tilt cylinder 19 extends. As bell crank 18 rotates around support pin 18*a* counterclockwise in FIG. 1, driving force is applied to bucket 6 with tilt rod 15 being interposed and bucket 6 is operated to be tilted back.

When it is determined in determination in step S37 that slip-during-excavation is occurring, first processor 30 outputs a command signal to raise boom 14. More specifically, first processor 30 outputs to control valve 26, a command signal to allow supply of hydraulic oil to a bottom-side oil chamber of boom cylinder 16. As the control valve that has received the command signal allows supply of hydraulic oil to the bottom-side oil chamber of boom cylinder 16, boom cylinder 16 extends. Driving force is thus applied to boom 14 and boom 14 is operated to be raised.

First processor 30 can thus output a control signal relating to an operation by the work implement when an ineffective operation is performed. When it is determined that work implement stall is occurring based on the fact that the operation command value for operating boom 14 is larger than the upper threshold value, a control signal to tilt back bucket 6 can be output to control valve 26 as a signal relating to working of work implement 3. When it is determined that slip-during-excavation is occurring based on the fact that the operation command value for operating boom 14 is smaller than the lower threshold value, a control signal to raise boom 14 can be output to control valve 26 as a signal relating to working of work implement 3.

Fourth Embodiment

Figure 19:
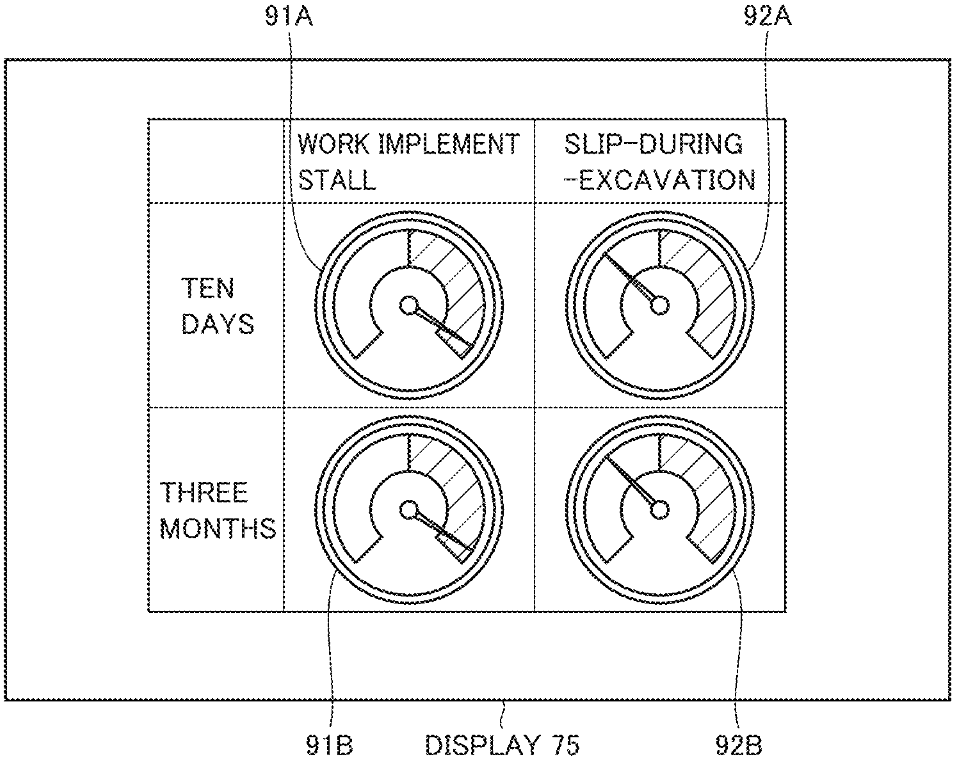
FIG. 19 is a schematic diagram showing exemplary representation on a display of a second processor.

In the first embodiment, an example in which a time period for which work implement stall and slip-during-excavation are occurring is shown on display 40 in cab 5 is described with reference FIG. 15. Without being limited to this example, information on a time period for which an ineffective operation is performed may be transmitted from first processor 30 to second processor 70 outside wheel loader 1 and the display of second processor 70 may show the time period for which the ineffective operation is performed. FIG. 19 is a schematic diagram showing exemplary representation on display 75 of second processor 70.

Information shown on display 75 does not serve to give real-time notification about occurrence of an ineffective operation but shows a record of a time period for which an ineffective operation has been performed with respect to an excavation time period within a certain period. Representation 91A shows a time period for which work implement stall occurred within ten days. Representation 91B shows a time period for which work implement stall occurred within three months. Representation 91C shows a time period for which slip-during-excavation occurred within ten days. Representation 92D shows a time period for which slip-during-excavation occurred within three months.

By thus visualizing an excavation time period, a time period for which work implement stall occurred, and a time period for which slip-during-excavation occurred, whether or not an excavation work has satisfactorily or dissatisfactory been performed can readily be evaluated. A situation of a work may be shown for each operator for training of a less experienced operator. Representation shown in FIG. 19 may be provided as a web content so that a situation in an excavation work can remotely be viewed or shared among a plurality of locations.

The situation of occurrence of an ineffective operation may be output as a printed matter by a not-shown printer connected to second processor 70.

Fifth Embodiment

In the embodiments so far, an example in which wheel loader 1 includes first processor 30 and first processor 30 mounted on wheel loader 1 is responsible for control at the time when an ineffective operation is performed is described. A controller responsible for control at the time when an ineffective operation is performed does not necessarily have to be mounted on wheel loader 1.

Figure 20:
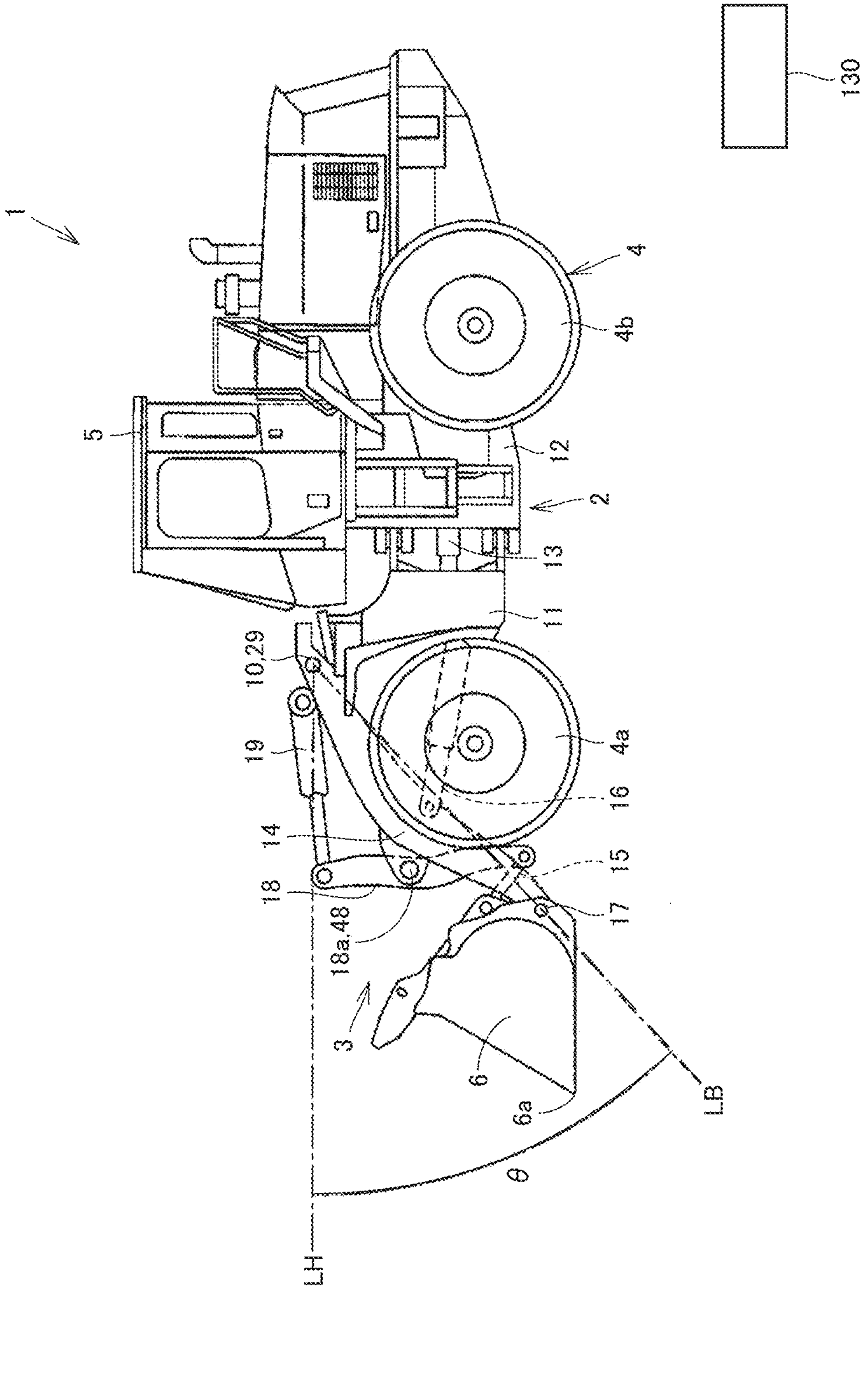
FIG. 20 is a schematic diagram of a system including a wheel loader.

FIG. 20 is a schematic diagram of a system including wheel loader 1. A system in which first processor 30 of wheel loader 1 performs processing for transmitting a signal indicating states of wheel loader 1 detected by various sensors to an external controller 130 and external controller 130 that has received the signal is responsible for control at the time when an ineffective work is performed may be configured. Controller 130 may be arranged at a site of a work by wheel loader 1 or at a remote location distant from the site of the work by wheel loader 1.

First processor 30 described in the first embodiment and controller 130 described in the fifth embodiment may be implemented by a single apparatus or a plurality of apparatuses. A plurality of apparatuses implementing first processor 30 and/or controller 130 may be arranged as being distributed.

Function and Effect

Functions and effects of the embodiments described above will now be described.

In the embodiments, as shown in FIGS. 12 and 14, first processor 30 determines that an ineffective operation in which work implement 3 does not work is performed based on an operation command value output from the operation apparatus for operating running wheel 4*a* and work implement 3. As shown in FIGS. 11, 15, and 19, first processor 30 outputs a time period for which the ineffective operation is being performed.

By outputting a time period for which the ineffective operation in which work implement 3 is not working is being performed, an operator or a manager can readily know that the ineffective operation is being performed. The operator himself/herself can consciously have a work done with the ineffective operation being reduced. A supervisor can train an operator so as to reduce the ineffective operation. Therefore, a time period for which the ineffective operation is performed during an excavation work can be reduced.

As shown in FIG. 2, wheel loader 1 is provided with a plurality of sensors that detect states of wheel loader 1. As shown in FIGS. 9 and 10, first processor 30 determines whether or not an excavation work is being performed based on signals from the sensors. Whether or not the excavation work is being performed can thus accurately be determined.

As shown in FIGS. 11, 15, and 19, when first processor 30 determines that slip-during-excavation in which running wheel 4*a* slips with respect to the ground is occurring during the excavation work, it outputs a time period for which slip-during-excavation is occurring. By making the operator conscious about mitigation of slip-during-excavation, slip-during-excavation can be eliminated in a short period of time.

As shown in FIG. 14, when the operation command value for operating boom 14 is smaller than the lower threshold value, first processor 30 determines that slip-during-excavation is occurring. By doing so, occurrence of slip-during-excavation can clearly be determined in a simplified manner.

As shown in FIGS. 2 and 14, first processor 30 calculates a rotation speed of running wheel 4*a* based on a signal from vehicle speed detector 27. By doing so, occurrence of slip-during-excavation can more reliably be determined.

As shown in FIGS. 11, 15, and 19, when first processor 30 determines that work implement stall in which work implement 3 is unable to work is occurring during an excavation work, it outputs a time period for which work implement stall is occurring. By making the operator conscious about mitigation of work implement stall, the work implement can come out of stall in a short period of time.

As shown in FIG. 12, when the operation command value for operating boom 14 is larger than the upper threshold value and a speed of raise of boom 14 is smaller than the threshold value, first processor 30 determines that work implement stall is occurring. By doing so, occurrence of work implement stall can clearly be determined in a simplified manner.

As shown in FIG. 15, first processor 30 further outputs a time period for which the excavation work is determined as being performed. The operator or the manager can readily know a time period for the excavation work.

As shown in FIGS. 15 and 19, first processor 30 outputs a ratio of a time period for which the ineffective operation is being performed to the time period for which the excavation work is determined as being performed. The operator or the manager can readily know whether or not the ratio of the time period for which the ineffective operation is being performed is lower than an allowable limit and the operator can more efficiently be made conscious about mitigation of the ineffective operation.

A work machine to which the concept of the present disclosure can be applied is not limited to the wheel loader and it may be a work machine including a work implement, such as a hydraulic excavator, a crawler dozer, or a motor grader.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST

1 wheel loader; 3 work implement; 4 traveling unit; 4*a*, 4*b* running wheel; 6 bucket; 6*a* cutting edge; 14 boom; 16 boom cylinder; 19 tilt cylinder; 20 engine; 23 motive power transmission mechanism; 26 control valve; 27 vehicle speed detector; 28*a*, 28*b* pressure sensor; 29 first angle detector; 30 first processor; 30*j* storage; 30*t* timer; 40, 75 display; 45 output unit; 48 second angle detector; 49 forward and rearward travel switching apparatus; 49*a* operation member; 49*b* member position detection sensor; 51 accelerator operation apparatus; 51*a* accelerator operation member; 51*b* accelerator operation detection unit; 52 boom operation apparatus; 52*a* boom operation member; 52*b* boom operation detection unit; 54 bucket operation apparatus; 54*a* bucket operation member; 54*b* bucket operation detection unit; 58 brake operation apparatus; 58*a* brake operation member; 58*b* brake operation detection unit; 70 second processor; 81 fuel efficiency meter; 81A first gauge area; 81B second gauge area; 81C third gauge area; 81N, 84N, 85N needle-shaped portion; 82 work implement stall caution lamp; 83 slip-during-excavation caution lamp; 84 work implement stall indicator; 84A, 85A first area; 84B, 85B second area; 85 slip-during-excavation indicator; 86 gauge; 87 tilt-back command lamp; 88 boom raise command lamp; 91A, 91B, 91C, 92D representation; 100 excavated object; 130 controller; 200 dump truck

The invention claimed is:

1. A work machine comprising:

a vehicular body;

a running wheel rotatably attached to the vehicular body;

a work implement operable with respect to the vehicular body;

an operation apparatus for operating the running wheel and the work implement; and a controller that controls an operation by the work machine, wherein the controller determines that an ineffective operation, in which the work implement does not work in spite of an operation of the operation apparatus, is being performed during an excavation work based on an operation command value output from the operation apparatus, and outputs a time period for which the ineffective operation is being performed, when the controller determines that slip-during-excavation which refers to slip of the running wheel with respect to ground is occurring during the excavation work, the controller outputs a time period for which the slip-during-excavation is occurring, the work implement includes a boom, the operation apparatus includes a boom operation apparatus for operating the boom, and when the operation command value output from the boom operation apparatus is smaller than a first threshold value, the controller determines that the slip-during-excavation is occurring.

2. The work machine according to claim 1, further comprising at least one sensor that detects a state of the work machine, wherein the controller determines whether the work machine is performing the excavation work based on a signal from the sensor.

3. The work machine according to claim 1, wherein the controller calculates a rotation speed of the running wheel based on a signal from a sensor.

4. The work machine according to claim 1, wherein the controller further outputs a time period for which the excavation work is determined as being performed.

5. The work machine according to claim 4, wherein the controller outputs a ratio of the time period for which the ineffective operation is being performed to the time period for which the excavation work is determined as being performed.

6. A system including a work machine comprising:

a vehicular body;

a running wheel rotatably attached to the vehicular body;

a work implement operable with respect to the vehicular body;

an operation apparatus for operating the running wheel and the work implement; and a controller that controls an operation by the work machine, wherein the controller determines that an ineffective operation, in which the work implement does not work in spite of an operation of the operation apparatus, is being performed during an excavation work based on an operation command value output from the operation apparatus, and outputs a time period for which the ineffective operation is being performed, when the controller determines that slip-during-excavation which refers to slip of the running wheel with respect to ground is occurring during the excavation work, the controller outputs a time period for which the slip-during-excavation is occurring, the work implement includes a boom, the operation apparatus includes a boom operation apparatus for operating the boom, and when the operation command value output from the boom operation apparatus is smaller than a first threshold value, the controller determines that the slip-during-excavation is occurring.

7. A work machine comprising:

a vehicular body;

a running wheel rotatably attached to the vehicular body;

a work implement operable with respect to the vehicular body;

an operation apparatus for operating the running wheel and the work implement; and a controller that controls an operation by the work machine, wherein the controller determines that an ineffective operation, in which the work implement does not work in spite of an operation of the operation apparatus, is being performed during an excavation work based on an operation command value output from the operation apparatus, and outputs a time period for which the ineffective operation is being performed, the work implement includes a bucket, when the controller determines that work implement stall in which the work implement is unable to work is occurring during the excavation work, the controller outputs a time period for which the work implement stall is occurring, the work implement includes a boom, the operation apparatus includes a boom operation apparatus for operating the boom, and the controller calculates a speed of raise of the boom based on a signal from a sensor, and when the operation command value output from the boom operation apparatus is larger than a second threshold value and the speed of raise is smaller than a third threshold value, the controller determines that the work implement stall is occurring.

8. A system including a work machine comprising:

a vehicular body;

a running wheel rotatably attached to the vehicular body;

a work implement operable with respect to the vehicular body;

an operation apparatus for operating the running wheel and the work implement; and a controller that controls an operation by the work machine, wherein the controller determines that an ineffective operation, in which the work implement does not work in spite of an operation of the operation apparatus, is being performed during an excavation work based on an operation command value output from the operation apparatus, and outputs a time period for which the ineffective operation is being performed, the work implement includes a bucket, when the controller determines that work implement stall in which the work implement is unable to work is occurring during the excavation work, the controller outputs a time period for which the work implement stall is occurring, the work implement includes a boom, the operation apparatus includes a boom operation apparatus for operating the boom, and the controller calculates a speed of raise of the boom based on a signal from a sensor, and when the operation command value output from the boom operation apparatus is larger than a second threshold value and the speed of raise is smaller than a third threshold value, the controller determines that the work implement stall is occurring.

* * * * *